(12) United States Patent
Zhang et al.

(10) Patent No.: US 11,665,600 B2
(45) Date of Patent: *May 30, 2023

(54) NEIGHBOR CELL LAYER 1 METRICS FOR FAST CELL CHANGE

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 17/115,292

(22) Filed: Dec. 8, 2020

(65) Prior Publication Data

US 2021/0195476 A1 Jun. 24, 2021

Related U.S. Application Data

(60) Provisional application No. 62/950,758, filed on Dec. 19, 2019.

(51) Int. Cl.
*H04W 36/00* (2009.01)
*H04W 24/08* (2009.01)
*H04L 5/00* (2006.01)

(52) U.S. Cl.
CPC ....... *H04W 36/0058* (2018.08); *H04L 5/0048* (2013.01); *H04W 24/08* (2013.01); *H04W 36/0061* (2013.01)

(58) Field of Classification Search
CPC .......................... H04W 36/0072; H04W 16/28
See application file for complete search history.

(56) References Cited

U.S. PATENT DOCUMENTS

2016/0007261 A1* 1/2016 Oh ..................... H04B 7/0695
455/438
2018/0219664 A1 8/2018 Guo et al.
(Continued)

FOREIGN PATENT DOCUMENTS

CN 112929926 A 6/2021
WO 2018173001 A1 9/2018
(Continued)

OTHER PUBLICATIONS

Ericsson: "[99-bis#20][NR] TP on RRM (Ericsson)," 3GPP Draft, 3GPP TSG-RAN WG2 #100, R2-1714128—Updated Summary [99-BIS#20] [NR] TP ON RRM (Ericsson), 3rd Generation Partnership Project (3GPP), Mobile Competence Centre; 650, Route Des Lucioles; F-06921, Sophia-Antipolis Cedex; France, vol. RAN WG2, No. Reno, USA, Nov. 27, 2017-Dec. 1, 2017, Dec. 2, 2017 (Dec. 2, 2017), XP051372758, 87 pages, Retrieved from the Internet: URL: http://www.3gpp.org/ftp/tsg%5Fran/WG2%5FRL2/TSGR2%5F100/Docs/ [retrieved on Dec. 2, 2017] section 5.5.
(Continued)

*Primary Examiner* — Yee F Lam
(74) *Attorney, Agent, or Firm* — ArentFox Schiff LLP

(57) ABSTRACT

A user equipment (UE) measures, for each of at least one beam of each of at least one neighboring cell of a UE, at least one reference signal (RS) to obtain at least one layer 1 (L1) beam measurement. The UE derives, for each neighboring cell based on each L1 beam measurement corresponding to the each neighboring cell, at least one L1 measurement reporting value. The transmits, to a serving cell serving the UE 104, a report based on each derived L1 measurement reporting value.

18 Claims, 13 Drawing Sheets

(56) References Cited

U.S. PATENT DOCUMENTS

| | | | |
|---|---|---|---|
| 2019/0238202 A1 | 8/2019 | Chavva et al. | |
| 2019/0349819 A1 | 11/2019 | Xu et al. | |
| 2019/0357092 A1* | 11/2019 | Jung | H04W 36/0055 |
| 2020/0007195 A1* | 1/2020 | Yiu | H04B 7/0857 |
| 2020/0021336 A1 | 1/2020 | Da Silva et al. | |
| 2020/0314708 A1* | 10/2020 | Jassal | H04W 36/08 |
| 2020/0322023 A1* | 10/2020 | Kung | H04B 7/0626 |
| 2020/0344628 A1* | 10/2020 | Awada | H04W 72/06 |
| 2020/0351790 A1* | 11/2020 | Hsieh | H04W 52/0245 |
| 2020/0374960 A1* | 11/2020 | Deenoo | H04W 72/1284 |
| 2020/0383022 A1 | 12/2020 | Shrestha et al. | |
| 2020/0389847 A1* | 12/2020 | Deng | H04W 76/28 |
| 2021/0195453 A1 | 6/2021 | Zhang et al. | |
| 2021/0297850 A1 | 9/2021 | Matsumura et al. | |
| 2021/0368399 A1 | 11/2021 | Zou et al. | |
| 2021/0392526 A1* | 12/2021 | Da Silva | H04W 24/08 |
| 2022/0131793 A1* | 4/2022 | Ramachandra | H04W 36/305 |
| 2022/0174567 A1* | 6/2022 | Awada | H04W 76/19 |
| 2022/0240110 A1* | 7/2022 | Li | H04W 24/10 |
| 2022/0295367 A1 | 9/2022 | Yang et al. | |

FOREIGN PATENT DOCUMENTS

| | | |
|---|---|---|
| WO | 2019088905 A1 | 5/2019 |
| WO | 2019138288 A1 | 7/2019 |

OTHER PUBLICATIONS

International Search Report and Written Opinion—PCT/US2020/064078—ISA/EPO—dated Apr. 7, 2021.

Ericsson: "Remaining Open Issues on Measurement Reporting in NR," 3GPP Draft, 3GPP TSG-RAN WG2 #Ad Hoc, Tdoc R2-1707286, 3rd Generation Partnership Project (3GPP), Mobile Competence Centre, 650, Route Des Lucioles, F-06921, Sophia-Antipolis Cedex, France, vol. RAN WG2, No. Qingdao, China, Jun. 27, 2017-Jun. 29, 2017, XP051301774, 8 Pages.

Huawei, et al., "Corrections on RRM TP," 3GPP Draft, 3GPP TSG-RAN WG2#100 Meeting, R2-1713427, 3rd Generation Partnership Project (3GPP), Mobile Competence Centre, 650, Route Des Lucioles, F-06921, Sophia-Antipolis Cedex, France, vol. RAN WG2, No. Reno, Nevada, US, Nov. 27, 2017-Dec. 1, 2017, XP051372154, 8 pages.

Samsung: "Terminology Mismatch for CSI Framework," 3GPP Draft, 3GPP TSG RAN WG1 NR-AH1, R1-1800426, NR Report Setting, 3rd Generation Partnership Project (3GPP), Mobile Competence Centre, 650, Route Des Lucioles, F-06921, Sophia-Antipolis Cedex, France, vol. RAN WG1, No. Vancouver, Canada, Jan. 22, 2018-Jan. 26, 2018, XP051384861, 5 pages.

* cited by examiner

NEIGHBOR CELL LAYER 1 METRICS FOR FAST CELL CHANGE

CROSS-REFERENCE TO RELATED APPLICATIONS

This application claims the benefit of U.S. Provisional Patent Application No. 62/950,758, entitled "Neighbor Cell Layer 1 Metrics for Fast Cell Change," filed Dec. 19, 2019, which is expressly incorporated by reference herein in its entirety.

BACKGROUND

The present disclosure relates generally to communication systems, and more particularly, to neighbor cell layer 1 (L1) metrics for a fast cell change.

Wireless communication systems are widely deployed to provide various telecommunication services such as telephony, video, data, messaging, and broadcasts.

Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Due to the increasing demand for wireless communications, there is a desire to improve the efficiency of wireless communication network techniques, such as to improve the efficiency of user equipment mobility in the wireless communication network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication by a user equipment (UE), including measuring reference signals of one beam, or of multiple different beams, for one or more neighbor cells of the UE, to obtain a plurality of one beam measurement quantity result per neighbor cell or a plurality of multiple different beam measurement quantity results per neighbor cell. The method further includes deriving a beam measurement quantity reporting value for the one beam or for the multiple different beams per neighbor cell based on applying a layer 1 filtering procedure to the plurality of one beam measurement quantity results per neighbor cell or the plurality of multiple different beam measurement quantity results per neighbor cell, wherein the layer 1 filtering procedure includes: determining the beam measurement quantity reporting value for the one beam or for each of the multiple different beams per neighbor cell as a highest value one of the plurality of one beam measurement quantity results per neighbor cell or each of the plurality of multiple different beam measurement quantity results per neighbor cell under certain conditions, and determining the beam measurement quantity reporting value for the one beam or for each of the multiple different beams per neighbor cell as a linear power scale average of highest value ones of the plurality of one beam measurement quantity results per neighbor cell or the plurality of multiple different beam measurement quantity results per neighbor cell above a layer 1 measurement value threshold for consolidation, where a total number of averaged ones of the plurality of one beam measurement quantity results per neighbor cell or the plurality of multiple different beam measurement quantity results per neighbor cell does not exceed a layer 1 maximum number of measurements to be averaged threshold. Additionally, the method further includes recording the beam measurement quantity reporting value for the one beam or for each of the multiple different beams per neighbor cell according to a reporting value format to define a formatted beam measurement quantity reporting value for the one beam or for each of the multiple different beams per neighbor cell. Additionally, the method further includes transmitting a report including the formatted beam measurement quantity reporting value for the one beam or for each of the multiple different beams per neighbor cell to a serving cell of the UE.

Another example implementation includes a user equipment (UE) apparatus, including a processor and a memory in communication with the processor. The memory storing instructions which, when executed by the processor, cause the processor to measure reference signals of one beam or of multiple different beams for one or more neighbor cells of the UE to obtain a plurality of one beam measurement quantity results per neighbor cell or a plurality of multiple different beam measurement quantity results per neighbor cell. The instructions when executed by the processor further cause the processor to derive a beam measurement quantity reporting value for the one beam or for the multiple different beams per neighbor cell based on applying a layer 1 filtering procedure to the plurality of one beam measurement quantity results per neighbor cell or the plurality of multiple different beam measurement quantity results per neighbor cell, wherein the layer 1 filtering procedure includes: determining the beam measurement quantity reporting value for the one beam or for each of the multiple different beams per neighbor cell as a highest value one of the plurality of one beam measurement quantity results per neighbor cell or each of the plurality of multiple different beam measurement quantity results per neighbor cell under certain conditions, and determining the beam measurement quantity reporting value for the one beam or for each of the multiple different beams per neighbor cell as a linear power scale average of highest value ones of the plurality of one beam measurement quantity results per neighbor cell or the plurality of multiple different beam measurement quantity results per neighbor cell above a layer 1 measurement value threshold for consolidation, where a total number of averaged ones of the plurality of one beam measurement quantity results per neighbor cell or the plurality of multiple different beam measurement quantity results per neighbor cell does not exceed the layer 1 maximum number of measurements to be averaged threshold. Additionally, the instructions when executed by the processor further cause the processor to record the beam measurement quantity reporting value for the one beam or for each of the multiple different beams per neighbor cell according to a reporting value format to define a formatted beam measurement quantity reporting value for the one beam or for each of the multiple different beams per neighbor cell. Additionally, the instructions when executed by the processor further cause the processor to transmit a report including the formatted beam measurement quantity reporting value for the one beam or for each of the multiple different beams per neighbor cell to a serving cell of the UE.

Another example implementation includes a user equipment (UE) apparatus, including means for measuring reference signals of one beam or of multiple different beams for one or more neighbor cells of the UE to obtain a plurality of one beam measurement quantity results per neighbor cell or a plurality of multiple different beam measurement quantity results per neighbor cell. The apparatus further includes means for deriving a beam measurement quantity reporting value for the one beam or for the multiple different beams per neighbor cell based on applying a layer 1 filtering procedure to the plurality of one beam measurement quantity results per neighbor cell or the plurality of multiple different beam measurement quantity results per neighbor cell, wherein the layer 1 filtering procedure includes means for determining the beam measurement quantity reporting value for the one beam or for each of the multiple different beams per neighbor cell as a highest value one of the plurality of one beam measurement quantity results per neighbor cell or each of the plurality of multiple different beam measurement quantity results per neighbor cell under certain conditions and means for determining the beam measurement quantity reporting value for the one beam or for each of the multiple different beams per neighbor cell as a linear power scale average of highest value ones of the plurality of one beam measurement quantity results per neighbor cell or the plurality of multiple different beam measurement quantity results per neighbor cell above a layer 1 measurement value threshold for consolidation, where a total number of averaged ones of the plurality of one beam measurement quantity results per neighbor cell or the plurality of multiple different beam measurement quantity results per neighbor cell does not exceed the layer 1 maximum number of measurements to be averaged threshold. Additionally, the apparatus further includes means for recording the beam measurement quantity reporting value for the one beam or for each of the multiple different beams per neighbor cell according to a reporting value format to define a formatted beam measurement quantity reporting value for the one beam or for each of the multiple different beams per neighbor cell. Additionally, the apparatus further includes means for transmitting a report including the formatted beam measurement quantity reporting value for the one beam or for each of the multiple different beams per neighbor cell to a serving cell of the UE.

Another example implementation includes a computer-readable medium storing instructions for wireless communication by a user equipment (UE), executable by a processor to measure reference signals of one beam or of multiple different beams for one or more neighbor cells of the UE to obtain a plurality of one beam measurement quantity results per neighbor cell or a plurality of multiple different beam measurement quantity results per neighbor cell. The instructions are further executable to derive a beam measurement quantity reporting value for the one beam or for the multiple different beams per neighbor cell based on applying a layer 1 filtering procedure to the plurality of one beam measurement quantity results per neighbor cell or the plurality of multiple different beam measurement quantity results per neighbor cell, wherein the layer 1 filtering procedure includes: determining the beam measurement quantity reporting value for the one beam or for each of the multiple different beams per neighbor cell as a highest value one of the plurality of one beam measurement quantity results per neighbor cell or each of the plurality of multiple different beam measurement quantity results per neighbor cell under certain conditions, and determining the beam measurement quantity reporting value for the one beam or for each of the multiple different beams per neighbor cell as a linear power scale average of highest value ones of the plurality of one beam measurement quantity results per neighbor cell or the plurality of multiple different beam measurement quantity results per neighbor cell above the layer 1 measurement value threshold for consolidation, where a total number of averaged ones of the plurality of one beam measurement quantity results per neighbor cell or the plurality of multiple different beam measurement quantity results per neighbor cell does not exceed the layer 1 maximum number of measurements to be averaged threshold. Additionally, the instructions are further executable to record the beam measurement quantity reporting value for the one beam or for each of the multiple different beams per neighbor cell according to a reporting value format to define a formatted beam measurement quantity reporting value for the one beam or for each of the multiple different beams per neighbor cell. Additionally, the instructions are further executable to transmit a report including the formatted beam measurement quantity reporting value for the one beam or for each of the multiple different beams per neighbor cell to a serving cell of the UE.

In some aspects, methods, apparatuses (including apparatuses comprising means for performing the features of such methods), and computer-readable medium storing instructions for wireless communication by a UE are disclosed. Such aspects include measuring, by a UE served by a serving cell, and for each of at least one beam of each of at least one neighboring cell of a UE, at least one reference signal (RS) to obtain at least one layer 1 (L1) beam measurement (e.g., an L1 metric). The UE then derives, for each neighboring cell based on each L1 beam measurement corresponding to the each neighboring cell, at least one L1 measurement reporting value (e.g., a cell-level L1 metric). The UE transmits, to the serving cell, a report based on each derived L1 measurement reporting value.

In some such aspects, deriving, for each neighboring cell based, at least one L1 measurement reporting value includes determining one of i) a highest value beam measurement as the at least one L1 measurement reporting value; and ii) a linear power scale average of a plurality of highest value beam measurements above an L1 layer 1 measurement value threshold for consolidation as the at least one L1 measurement reporting value. In some such aspects, determining one of the highest value beam measurement and the linear power scale average as the at least one L1 measurement reporting value includes i) determining the highest value L1 beam measurement as the at least one L1 measurement reporting value if: a L1 maximum number of beam measurements to be averaged threshold is not configured; or a L1 beam measurement value threshold for consolidation is not configured; or the highest value beam measurement is below or equal to a configured layer 1 beam measurement value threshold for consolidation; else ii) determining the linear power scale average as the at least one L1 measurement reporting value. In some such aspects, the UE further receives a configuration indicating one or more of: the L1 maximum number of beam measurements to be averaged threshold, the L1 beam measurement value threshold for consolidation, a measurement quantity type, or an RS type to be measured.

In some aspects, a number of beam measurements used in determining the linear power scale average as the at least one L1 measurement reporting value does not exceed a configured L1 maximum number of beam measurements to be averaged threshold. In some aspects, the at least one L1 beam measurement includes at least one reference signal received power (RSRP) value, at least one reference signal received quality (RSRQ) value, at least one signal to interference-plus-noise ratio (SINR) value, or any combination thereof. In some aspects, measuring at least one reference signal includes measuring at least one synchronization signal block (SSB). In some aspects, measuring at least one reference signal comprises measuring at least one channel state information reference signal (CSI-RS). In some aspects, measuring at least one reference signal includes measuring for a configured number of neighbor cells.

In some aspects, the UE further receives a cell switch command indicating a target neighbor cell based on the report; and switches a communication connection from the serving cell to the target neighbor cell. In some such aspects, the cell switch command further indicates a target beam of the target cell, and wherein switching the communication connection includes switching to receiving the target beam.

In some aspects, the at least one L1 measurement reporting value is a cell-level L1 beam measurement reporting value for each at least one neighboring cell, and each cell-level L1 beam measurement reporting value corresponds to a beam measurement for one of X neighboring cells. In some aspects, the at least one L1 measurement reporting value is a beam level L1 beam measurement reporting value for each beam of each neighboring cell, and each beam-level L1 beam measurement reporting value reports a beam measurement for one of up to Y RS identifications (RS IDs) per cell.

In some aspects, methods, apparatuses (including apparatuses comprising means for performing the features of such methods), and computer-readable medium storing instructions for wireless communication by a serving cell of a base station are disclosed. Such aspects include receiving, from a UE being served by a serving cell, a report comprising at least one L1 measurement reporting value for each of one or more neighboring cells of the UE. The serving cell selects a target cell based on the at least one L1 measurement reporting value for each of one or more neighboring cells of the UE. The serving cell transmits, to the UE, a cell switch command indicating the target cell. In some such aspects, each at least one L1 measurement reporting value is a function of at least one beam measurement i) at the UE, and ii) based on at least one reference signal (RS) of at least one beam of each of at least one neighboring cell of the UE. In some such aspects, the cell switch command further indicates a target beam of the target cell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
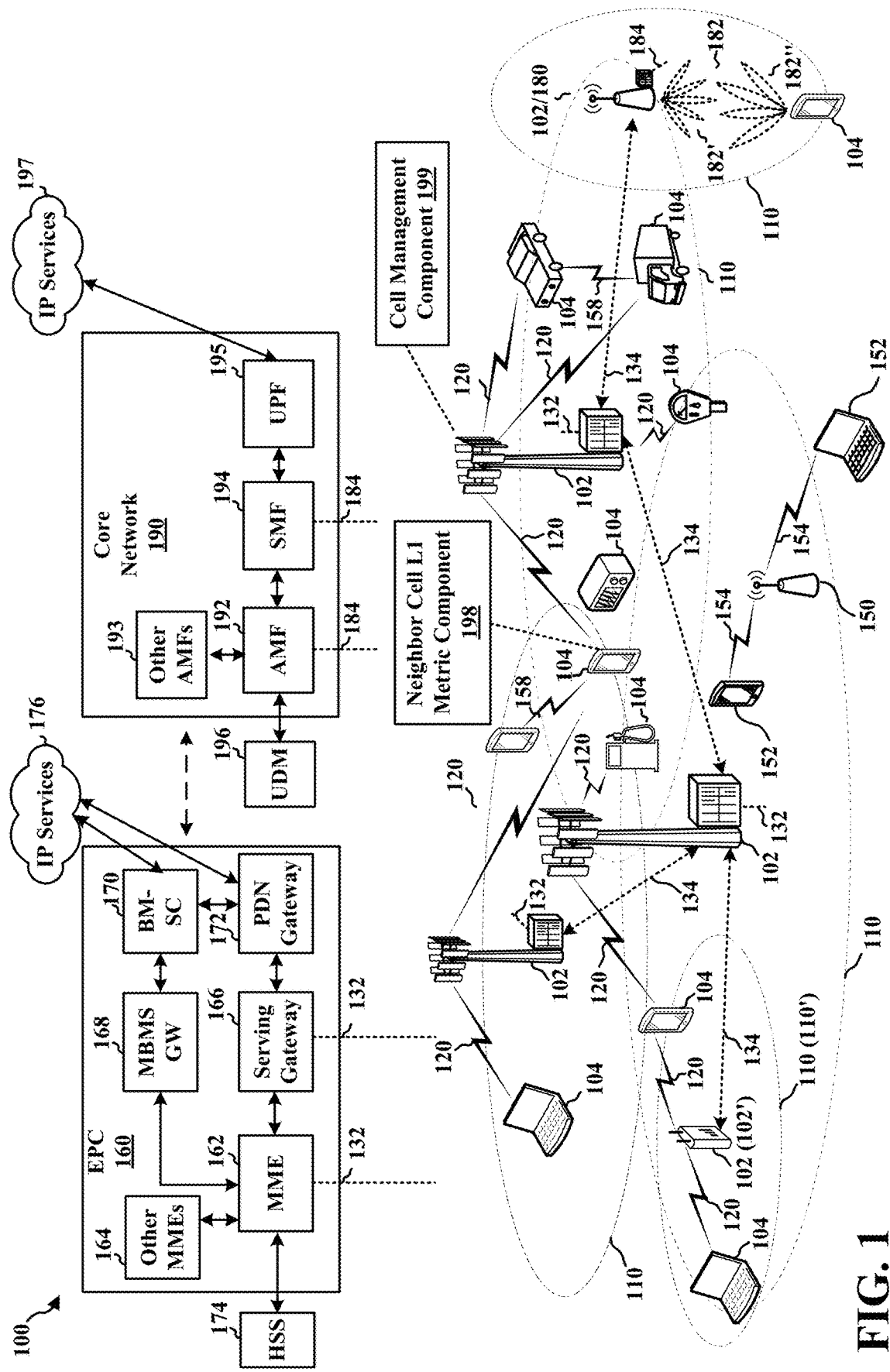
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The present disclosure include apparatus and methods for deriving cell level layer 1 (L1) metrics for one or more beams of each of one or more neighbor cells of a UE based on received reference signals, such as for use in performing a fast cell switch (or change). The L1 metrics may be referred to as beam measurement quantity results, and may include but are not limited to reference signal received power (RSRP) values, reference signal received quality (RSRQ) values, signal-to-interference-plus-noise ratio (SINR) values, or any combination thereof. Moreover, the reference signals may be, but are not limited to, synchronization signal blocks (SSBs) or channel state information reference signals (CSI-RS). Additionally, the present disclosure may further include a reporting format of the cell or beam level L1 metrics for the neighbor cells, including reporting the L1 metrics per cell or per reference signal per cell. The format may include an absolute value or a quantized value for reported cells or reference signals. Alternatively, the format may include a differential value (or quantized version) for at least some reported cells. For instance, an absolute value may be reported for the strongest reported cell or reference signal, while a differential value with respect to the strongest value is reported for remaining reported cells or reference signals. Thus, the present disclosure enables fast cell switches, which may avoid call drops and radio link failures experienced by existing solutions, especially for communications using millimeter wave signals.

FIG. 1 is a diagram illustrating an example of a wireless communications system 100 configured for use of layer 1 (L1) metrics of one or more neighbor cells of a user equipment (UE) to improve UE mobility within the wireless communications system 100. The wireless communications system 100 (also referred to as a wireless wide area network (WWAN)) includes base stations 102, UEs 104, an Evolved Packet Core (EPC) 160, and another core network 190 (e.g., a 5G Core (5GC)).

In certain aspects, the UE 104 may be configured to operate a neighbor cell layer 1 (L1) metric component 198 to report L1 metrics and/or implement fast cell switches as described in more detail below.

Correspondingly, in certain aspects, the network entity 102 (e.g., base station or cell) and/or another UE acting as a serving cell or base station, may be configured to operate a cell management component 199 to configure the L1 metric reporting, receive the reported L1 metrics, and/or implement fast cell switches as described in more detail below.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., Si interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 132, 134, and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
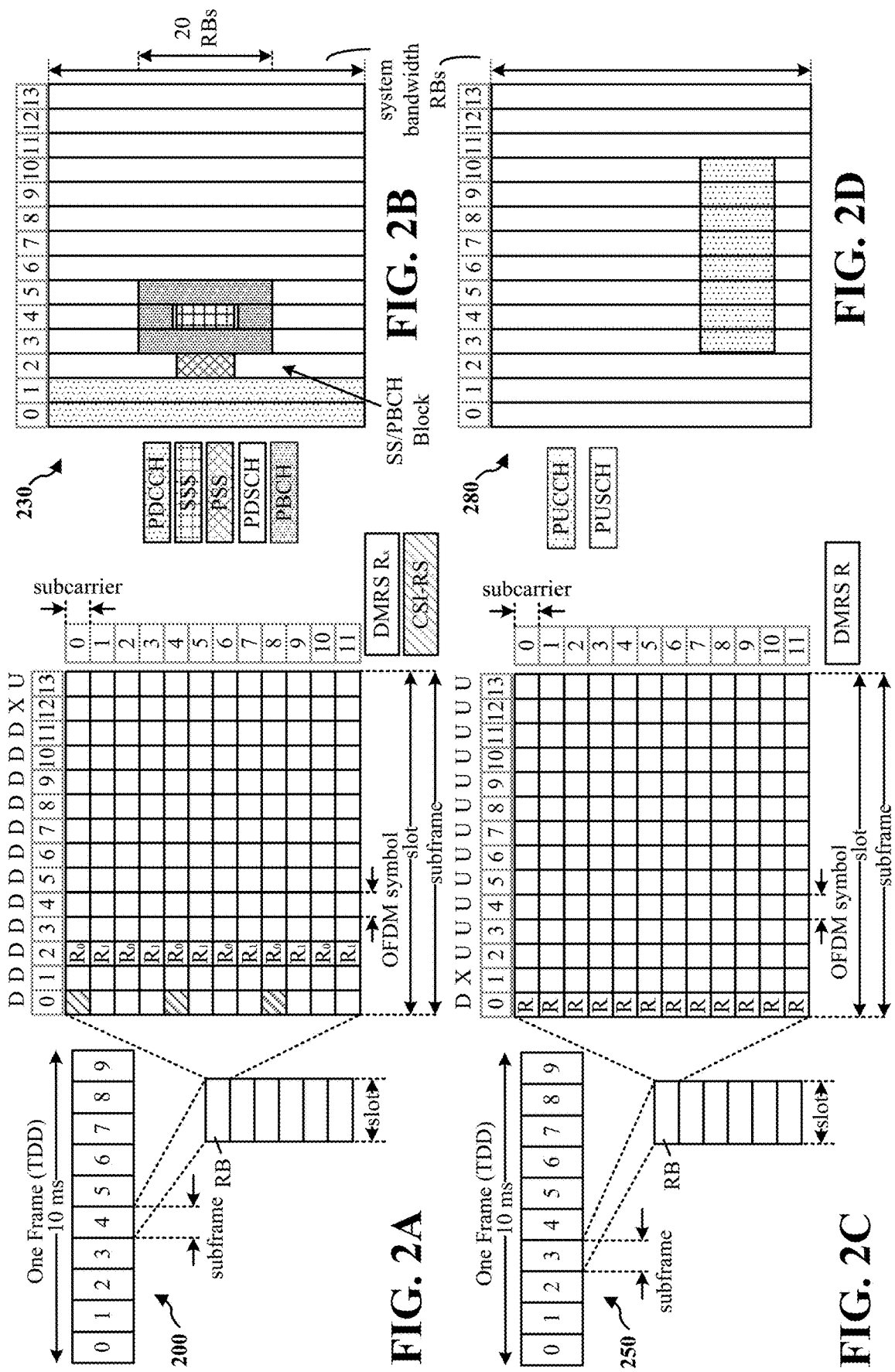
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIGS. 2A-2D include diagrams of example frame structures and resources that may be utilized in communications between the base stations 102, the UEs 104, and/or the secondary UEs (or sidelink UEs) 110 described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
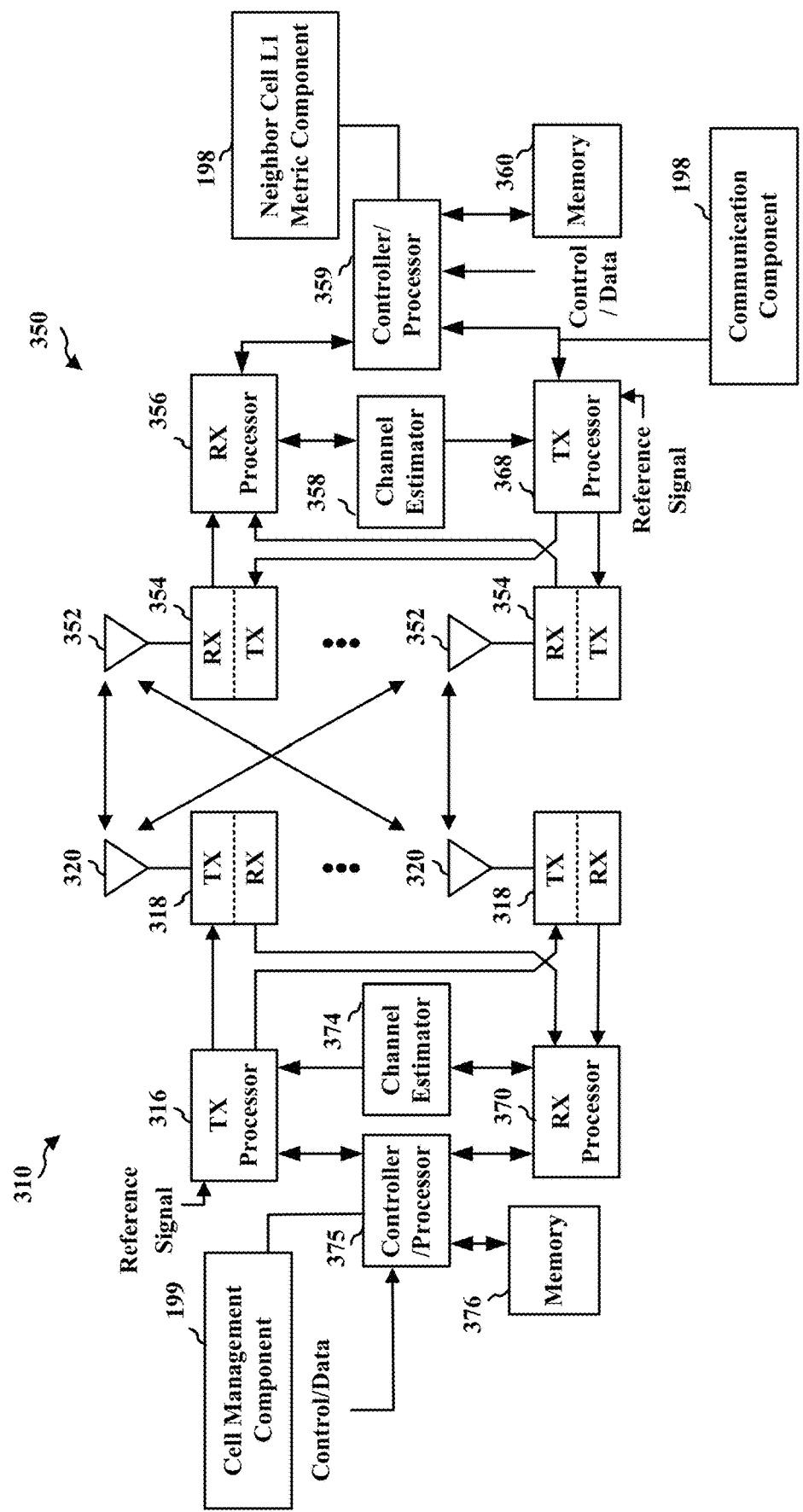
FIG. 3 is a diagram illustrating an example of a base station and user equipment (UE) in an access network.

FIG. 3 is a block diagram of a base station 310 in communication with a UE 350 in an access network, where the base station 310 may be an example implementation of base station 102 and where UE 350 may be an example implementation of UE 104. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with communication component 198 of FIG. 1.

At least one of the TX processor 316, the RX processor 370, and the controller/processor 375 may be configured to perform aspects in connection with communication component 199 of FIG. 1.

Figure 4:
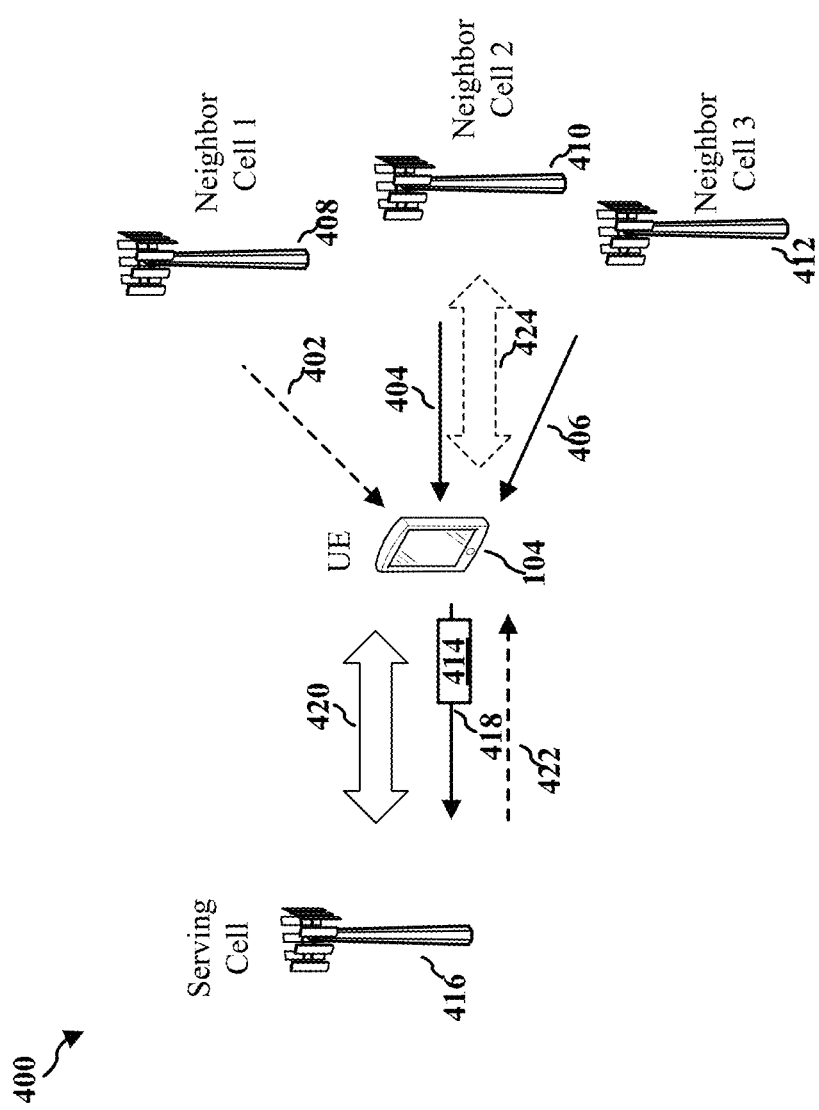
FIG. 4 is a diagram of an example scenario of reporting cell level L1 metrics for neighbor cells and performing a fast cell change according to the present aspects.

Referring to FIG. 4, an example scenario 400 generally relates to the UE 104 being configured to derive one or more layer 1 (L1) metrics for reference signals 402, 404, and 406 from one or more neighbor cells 408, 410, and 412, and provide the one or more L1 metrics 414 to a serving cell 416 in a beam report 418. In this example, the UE 104 may be in an connected mode 420 of communication with the serving cell 416, e.g., an RRC_connected mode, however, the UE 104 may be moving away from the serving cell 416 such that the signal from the serving cell 416 is weakening, and/or one of the one or more neighbor cells 408, 410, and 412 may be better suited for serving the UE 104, e.g., if signals from the serving cell 104 are being blocked or otherwise degraded and/or if the neighbor cells have stronger signals. It should be noted in this example that although the serving cell 416 and the one or more neighbor cells 408, 410, and 412 are illustrated as having different geographic locations, one of more of such cells may be co-located, where such co-located cells transmit signals on different frequency bands, on different beams, or according to different radio access technologies. As such, the serving cell 416 and the one or more neighbor cells 408, 410, and 412 may be part of different base stations, or one or more of such cells may be co-located on a same base station.

In this case, the serving cell 416 may evaluate the L1 metrics 414 and determine to generate a cell change command 422 to cause the UE 104 to establish a target cell as the new serving cell. In response, the UE 104 may perform a connection establishment procedure with the target cell, e.g., neighbor cell 410 in this example, to establish a connected mode 424 of communication. In this case, as the cell change command 422 is based on the L1 metrics 414, the cell change may be referred to as a "fast" cell change relative to a typical cell change that utilizes layer 3 (L3) metrics, which require a longer duration of obtaining measured values, and which involve additional and/or more complicated filtering techniques. For example, but not limited hereto, the L1 metrics 414 may be based on measurements obtained in a measurement time duration of 100 milliseconds (msec) or less, whereas the L3 metrics may be based on measurements obtained over time durations substantially longer. As such, a cell change that relies on L3 metrics may take a relatively longer time to implement, which may cause dropped calls and/or radio link failures in current solutions, especially in millimeter wave communications. Thus, a fast cell change (or fast cell switch) is not feasible using L3 metrics, however, the fast cell change may be successfully accomplished using the L1 metrics and other techniques of the present aspects.

Accordingly, the present disclosure provides a definition of cell level L1 metrics, including L1-RSRP/RSRQ/SINR per cell, which are different from cell level L3 metrics in the sense that they are not L3 filtered. Such cell level L1 metrics may be based on SSBs or CSI-RS.

For example, for cell level L1 metric measured based on SSBs, each L1 metric can be calculated as the measured L1 metric from one SSB, e.g. the strongest, or as the linear average of L1 metrics measured from multiple SSBs. Whether using one or multiple SSBs can be determined by an implicit rule, e.g. using multiple SSBs whose individual L1 metrics are above a preconfigured threshold, and using the strongest SSB if no SSB is above the threshold. In case that multiple SSBs are used to compute the cell level L1 metric, the used number of SSBs may be capped by a pre-configured maximum number threshold, e.g. only the top X SSBs are used, where X is an integer. Thus, based on the present disclosure, the cell level L1 metric can be measured either using one or multiple SSBs.

Alternatively, or in addition, using a similar procedure, the cell level L1 metric can be measured either using one or multiple CSI-RSs.

In a first more specific example, for each cell measurement quantity (e.g., the measurement quantity type such as RSRP, RSRQ, SINR, or some combination thereof) to be derived based on SSBs (e.g., one or more SS/PBCH blocks), deriving the L1 metric(s) may be based on a layer 1 filtering procedure that includes the following determinations:

If a layer 1 maximum number of beam measurements to be averaged threshold (e.g., nroJSS-BlocksToAverage in an associated measObject of a configuration included in a system information block) is not configured; or
    a layer 1 beam measurement value threshold for consolidation (e.g., an absThreshSS-BlocksConsolidation in the associated measObject of a configuration included in a system information block) is not configured; or
    a highest value one of the plurality of one beam measurement quantity results per neighbor cell or each of the plurality of multiple different beam measurement quantity results per neighbor cell per neighbor cell is below or equal to the layer 1 beam measurement value threshold for consolidation (e.g., the highest beam measurement quantity value is below or equal to the absThreshSS-BlocksConsolidation value);
then:
    derive each cell measurement quantity based on SS/PBCH block as the highest beam measurement quantity value (in other words, determine the beam measurement quantity reporting value for the one beam or for each of the multiple different beams per neighbor cell as a highest value one of the plurality of one beam measurement quantity results per neighbor cell or each of the plurality of multiple different beam measurement quantity results per neighbor cell);

else:
  derive each cell measurement quantity based on SS/PBCH block as the linear power scale average of the highest beam measurement quantity values above absThreshSS-BlocksConsolidation where the total number of averaged beams shall not exceed nrojSS-BlocksToAverage (in other words, determine the beam measurement quantity reporting value for the one beam or for each of the multiple different beams per neighbor cell as a linear power scale average of highest value ones of the plurality of one beam measurement quantity results per neighbor cell or the plurality of multiple different beam measurement quantity results per neighbor cell above the layer 1 measurement value threshold for consolidation, where a total number of averaged ones of the plurality of one beam measurement quantity results per neighbor cell or the plurality of multiple different beam measurement quantity results per neighbor cell does not exceed the layer 1 maximum number of measurements to be averaged threshold).

It should be noted that, in one implementation, to derive each cell measurement quantity based on SS/PBCH block as the highest beam measurement quantity value may be based on each beam measurement quantity as described in 3GPP Technical Specification 38.215.

In a second more specific example, for each cell measurement quantity (e.g., the measurement quantity type such as RSRP, RSRQ, SINR, or some combination thereof) to be derived based on CSI-RSs, consider a CSI-RS resource to be applicable for deriving cell measurements when the concerned CSI-RS resource is included in the CSI-RS-CellMobility parameter including the physCellId parameter of the cell in the CSI-RS-ResourceConfigMobility in the associated measObject. In this case, deriving the L1 metric(s) may be based on a layer 1 filtering procedure that includes the following determinations:

if:
  a layer 1 maximum number of beam measurements to be averaged threshold (e.g., nrofCSI-RS-ResourcesToAverage in an associated measObject of a configuration included in a system information block) is not configured; or
  a layer 1 beam measurement value threshold for consolidation (e.g., an absThresh CSI-RS-Consolidation in the associated measObject of a configuration included in a system information block) is not configured; or
  a highest value one of the plurality of one beam measurement quantity results per neighbor cell or each of the plurality of multiple different beam measurement quantity results per neighbor cell per neighbor cell is below or equal to the layer 1 beam measurement value threshold for consolidation (e.g., the highest beam measurement quantity value is below or equal to the absThresh CSI-RS-Consolidation value);
then:
  derive each cell measurement quantity based on applicable CSI-RS resources for the cell as the highest beam measurement quantity value (in other words, determine the beam measurement quantity reporting value for the one beam or for each of the multiple different beams per neighbor cell as a highest value one of the plurality of one beam measurement quantity results per neighbor cell or each of the plurality of multiple different beam measurement quantity results per neighbor cell);
else:
  derive each cell measurement quantity based on CSI-RS as the linear power scale average of the highest beam measurement quantity values above absThreshCSI-RS-Consolidation where the total number of averaged beams shall not exceed nrofCSI-RS-ResourcesToAverage (in other words, determine the beam measurement quantity reporting value for the one beam or for each of the multiple different beams per neighbor cell as a linear power scale average of highest value ones of the plurality of one beam measurement quantity results per neighbor cell or the plurality of multiple different beam measurement quantity results per neighbor cell above the layer 1 measurement value threshold for consolidation, where a total number of averaged ones of the plurality of one beam measurement quantity results per neighbor cell or the plurality of multiple different beam measurement quantity results per neighbor cell does not exceed the layer 1 maximum number of measurements to be averaged threshold).

It should be noted that, in one implementation, to derive each cell measurement quantity based on applicable CSI-RS resources for the cell as the highest beam measurement quantity value may be based on each beam measurement quantity as described in 3GPP Technical Specification 38.215.

Additionally, a report format of the cell or beam level L1 metrics for neighbor cells may be in a form that allows easy and efficient understanding, and/or that efficiently utilizes resource to communicate the information.

In a first implementation, for example, the report format of cell level L1 metrics, including L1-RSRP/RSRQ/SINR, may be configured to be reported per cell. For example, this may include reporting on up to X neighbor cells, where X is an integer. For instance, in one case, the format may include reporting the L1 metrics as an absolute value, or quantized version of the actual value, for every reported cell. A quantized version of the actual value means that a number of different ranges of actual values can be associated with a corresponding number of different quantized values. For example, a first range of actual values may be associated with a quantized value of 0, a second range of actual values may be associated with a quantized value of 1, etc. Alternatively, in another case, the format may include reporting the L1 metrics as a differential value or quantized version of the differential value for at least some reported cells. For example, in this case, the L1 metric in the form of an absolute value (or quantized version) may be reported for a strongest reported cell, while a differential value (or quantized differential value) with respect to the strongest value is reported for remaining reported cells.

In a second implementation, for example, the report format of cell level L1 metrics, including L1-RSRP/RSRQ/SINR, may be configured to be reported per reference signal (or reference signal identifier, RS ID) per cell. For example, this may include reporting on up to X reference signals per neighbor cell, where X is an integer. It should be noted that each reference signal (or RS ID) per cell may correspond to a different beam per cell. For instance, in one case, the format may include reporting the L1 metrics as an absolute value, or quantized version of the actual value, for every reported reference signal (or RS ID) per cell. Alternatively, in another case, the format may include reporting the L1 metrics as a differential value or quantized version of the differential value for at least some reported reference signals (or RS IDs). For example, in this case, the L1 metric in the form of an absolute value (or quantized version) may be reported for a strongest reported reference signal (or RS ID), while a differential value (or quantized differential value)

with respect to the strongest value is reported for remaining reported reference signals (or RS IDs).

Figure 5:
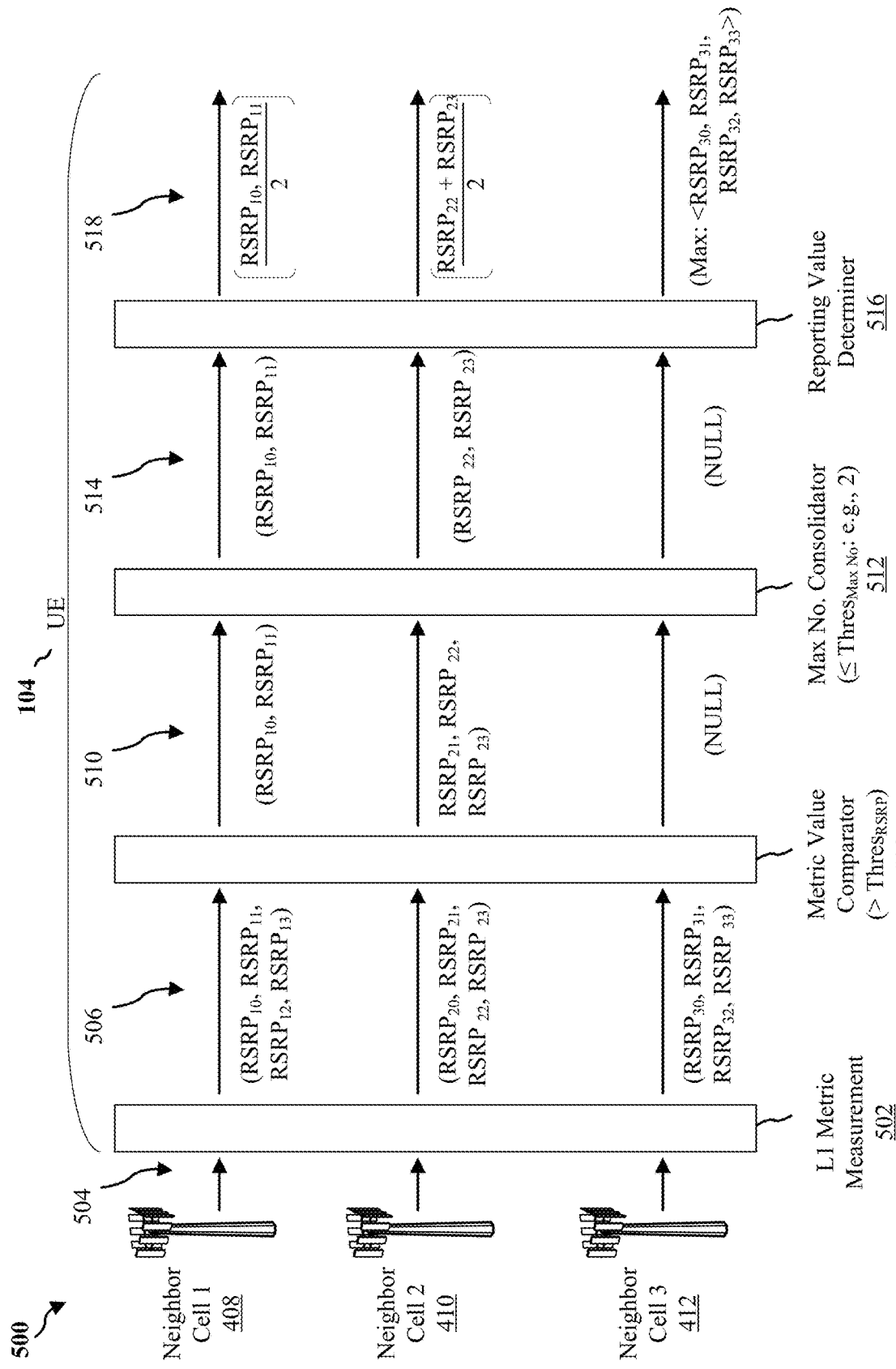
FIG. 5 is a diagram of an example scenario of deriving reported cell level L1 metrics for neighbor cells according to the present aspects.

Referring to FIG. 5, an example operational scenario 500 for deriving the L1 metrics in the form of RSRP values for one or more neighbor cells according to the techniques of the present disclosure includes the UE 104 operating various components to determine the appropriate L1 metrics for reporting.

For example, the UE 104 may include an L1 metric measuring component 502 configured to receive one or more reference signals 504 (e.g., reference signals 402, 404, and 406 of FIG. 4) from one or more neighbor cells, such as neighbor cells 408, 410, and 410, and generate a plurality of one beam measurement quantity results per neighbor cell or a plurality of multiple different beam measurement quantity results per neighbor cell at 506. In the illustrated example, the beam measurement quantity is RSRP, and the two digit subscript includes a first value that indicates the neighbor cell and a second value that identifies a measurement number. For instance, the parameter $RSRP_{10}$ indicates a first RSRP measurement value for the first neighbor cell, the parameter $RSRP_{11}$ indicates a second RSRP measurement value for the first neighbor cell, and so on.

Further, the UE 104 may include a metric value comparator component 508 configured to receive the beam measurement quantity results 506, compare them to a metric quantity value threshold (e.g., absThreshSS-BlocksConsolidation or absThreshCSI-RS-Consolidation), or $Thres_{RSRP}$ in this case, and output a subset of beam measurement quantity results MO for each neighbor cell. In this example, for the first neighbor cell 408, only two of the four RSRP values are greater than the threshold, while four RSRP values of the second neighbor cell 410 satisfy the threshold, and where none of the RSRP values of the third neighbor cell 412 satisfy the threshold, and hence a null set may be outputted.

Moreover, the UE 104 may include a maximum number consolidator component 512 configured to receive the subset of beam measurement quantity results 510 for each neighbor cell, compare the number in each subset MO to a consolidation threshold (e.g., nrofCSI-RS-ResourcesToAverage or nrofSS-BlocksToAverage) that limits a number of results that may be combined for reporting, e.g., $Thres_{max.no}$ such as a value of "2" in this case, and outputs a number of measurement results for determining the reporting value at 514. In this example, for the first neighbor cell 408, the two RSRP values of 510 satisfy the threshold, so both may be used. In contrast, for the second neighbor cell 410, the three RSRP values of 510 exceed the threshold, so the maximum number consolidator component 512 is configured to remove results in order to meet the threshold. For instance, in an implementation, the maximum number consolidator component 512 is configured to remove lowest value results, such as $RSRP_{21}$ in this case. Also, since none of the RSRP values of the third neighbor cell 412 remain at 510, and the null set may be outputted.

Additionally, the UE 104 may include a reporting value determiner component 516 configured to receive the measurement results for determining the reporting value from 514 for each neighbor cell, and derive and output beam measurement reporting values 518. For example, the reporting value determiner component 516 may determine the linear average of the values from 514 for both the first neighbor cell 408 and the second neighbor cell 410. In contrast, the reporting value determiner component 516 may determine a maximum of the initial beam measurement values for the third neighbor cell 412, e.g., Max: <$RSRP_{30}$, $RSRP_{31}$, $RSRP_{32}$, $RSRP_{33}$>, since none of the measurement values were sufficiently high enough to satisfy the RSRP threshold as determined by the metric value comparator component 508. Thus, the UE 104 may use the values at 518 to report L1 metrics of the neighbor cells to the serving cell.

As noted above, the beam measurement reporting values 518 may be per cell, or per reference signal per cell. Further, the beam measurement reporting values 518 may be absolute values, quantized values, or a combination of absolute or quantized values (e.g., for a highest value) and differential absolute or quantize values (e.g., for remaining values).

Figure 6:
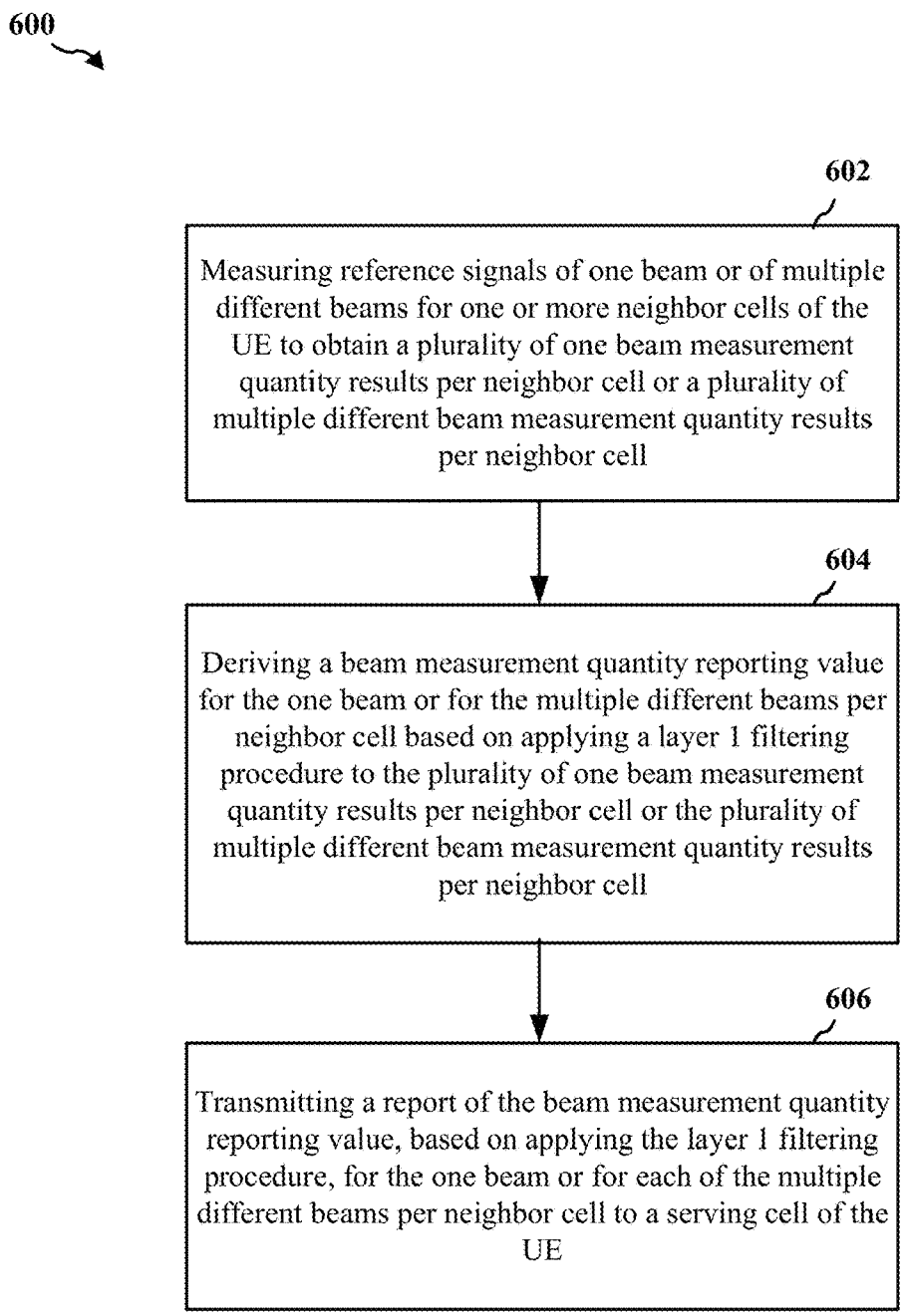
FIG. 6 is a flowchart of a method of wireless communication by a UE for reporting cell level L1 metrics for neighbor cells according to the present aspects.

FIG. 6 is a flowchart 600 of a method of wireless communication performed by a UE, such as UE 104 as discussed above and/or having the architecture of FIG. 8, including reporting cell level L1 metrics for neighbor cells such as for use in a fast cell change. As such, the method may be performed by a UE (e.g., the UE 104, the apparatus 350; the controller/processor 359 and/or the memory 360, the TX processor 368, the RX processor 356, the transceiver 802, processor(s) 812 and/or memory 816, or modem 840), which may be the entire UE 104 one or more components of UE in combination with the neighbor cell L1 metric component 198.

At 602, method 600 includes measuring reference signals of one beam or of multiple different beams for one or more neighbor cells of the UE to obtain a plurality of one beam measurement quantity results per neighbor cell or a plurality of multiple different beam measurement quantity results per neighbor cell. In an aspect, the UE 104, the neighbor cell L1 metric component 198, the L1 metric measurement component 502, the RF front end 888, the transceiver 802 or receiver 806, the modem 840, the processor 812 and/or the memory 816 may be configured to measure reference signals of one beam or of multiple different beams for one or more neighbor cells of the UE to obtain a plurality of one beam measurement quantity results per neighbor cell or a plurality of multiple different beam measurement quantity results per neighbor cell. As such, the UE 104 and/or one or more of the above-noted components may define a means for measuring reference signals of one beam or of multiple different beams for one or more neighbor cells of the UE to obtain a plurality of one beam measurement quantity results per neighbor cell or a plurality of multiple different beam measurement quantity results per neighbor cell. For example, the actions at 602 may be performed in a manner as described above with reference to FIG. 4 and FIG. 5.

In some cases, the plurality of one beam measurement quantity results per neighbor cell or the plurality of multiple different beam measurement quantity results per neighbor cell comprise reference signal received power (RSRP) values, reference signal received quality (RSRQ) values, signal to noise and interference ratio (SINR) values, or any combination thereof.

In some cases, measuring reference signals for the one beam or for the multiple different beams for the one or more neighbor cells comprises measuring synchronization signal blocks (SSBs).

Further, in some cases, measuring reference signals for the one beam or for the multiple different beams for the one or more neighbor cells comprises measuring channel state information reference signals (CSI-RSs).

Further, in some cases, measuring reference signals for the one beam or for the multiple different beams for the one or more neighbor cells comprises measuring for a configured number of neighbor cells.

At 604, method 600 includes deriving a beam measurement quantity reporting value for the one beam or for the multiple different beams per neighbor cell based on applying a layer 1 filtering procedure to the plurality of one beam measurement quantity results per neighbor cell or the plurality of multiple different beam measurement quantity results per neighbor cell. In an aspect, the UE 104, the neighbor cell L1 metric component 198, the metric value comparator component 508, the maximum number consolidator component 512, the reporting value determiner component 516, the modem 840, the processor 812 and/or the memory 816 may be configured to derive a beam measurement quantity reporting value for the one beam or for the multiple different beams per neighbor cell based on applying a layer 1 filtering procedure to the plurality of one beam measurement quantity results per neighbor cell or the plurality of multiple different beam measurement quantity results per neighbor cell. As such, the UE 104 and/or one or more of the above-noted components may define a means for deriving a beam measurement quantity reporting value for the one beam or for the multiple different beams per neighbor cell based on applying a layer 1 filtering procedure to the plurality of one beam measurement quantity results per neighbor cell or the plurality of multiple different beam measurement quantity results per neighbor cell. For example, the actions at 604 may be performed in a manner as described above with reference to FIG. 4 and FIG. 5.

In an implementation, the deriving according to the layer 1 filtering procedure includes determining the beam measurement quantity reporting value for the one beam or for each of the multiple different beams per neighbor cell as a highest value one of the plurality of one beam measurement quantity results per neighbor cell or each of the plurality of multiple different beam measurement quantity results per neighbor cell if: a layer 1 maximum number of beam measurements to be averaged threshold is not configured; or if a layer 1 beam measurement value threshold for consolidation is not configured; or if the highest value one of the plurality of one beam measurement quantity results per neighbor cell or each of the plurality of multiple different beam measurement quantity results per neighbor cell per neighbor cell is below or equal to the layer 1 beam measurement value threshold for consolidation.

Otherwise (e.g., else), the deriving according to the layer 1 filtering procedure includes determining the beam measurement quantity reporting value for the one beam or for each of the multiple different beams per neighbor cell as a linear power scale average of highest value ones of the plurality of one beam measurement quantity results per neighbor cell or the plurality of multiple different beam measurement quantity results per neighbor cell above the layer 1 measurement value threshold for consolidation, where a total number of averaged ones of the plurality of one beam measurement quantity results per neighbor cell or the plurality of multiple different beam measurement quantity results per neighbor cell does not exceed the layer 1 maximum number of measurements to be averaged threshold.

At 606, method 600 includes transmitting a report of the beam measurement quantity reporting value, based on applying the layer 1 filtering procedure, for the one beam or for each of the multiple different beams per neighbor cell to a serving cell of the UE. In an aspect, the UE 104, the neighbor cell L1 metric component 198, the L1 metric measurement component 502, the RF front end 888, the transceiver 802 or transmitter 808, the modem 840, the processor 812 and/or the memory 816 may be configured to transmit a report of the beam measurement quantity reporting value, based on applying the layer 1 filtering procedure, for the one beam or for each of the multiple different beams per neighbor cell to a serving cell of the UE. As such, the UE 104 and/or one or more of the above-noted components may define a means for transmitting a report of the beam measurement quantity reporting value, based on applying the layer 1 filtering procedure, for the one beam or for each of the multiple different beams per neighbor cell to a serving cell of the UE. For example, the actions at 606 may be performed in a manner as described above with reference to FIG. 4 and FIG. 5.

In some implementations, the method 600 may alternatively or additionally include receiving a configuration indicating one or more of the layer 1 maximum number of beam measurements to be averaged threshold, the layer 1 beam measurement value threshold for consolidation, a measurement quantity type, or a reference signal type.

In some implementations, the method 600 may alternatively or additionally include receiving a cell switch command indicating a target neighbor cell based on the report of the beam measurement quantity reporting value for the one beam or for each of the multiple different beams per neighbor cell, and switching a communication connection from the serving cell to the target neighbor cell.

Figure 7:
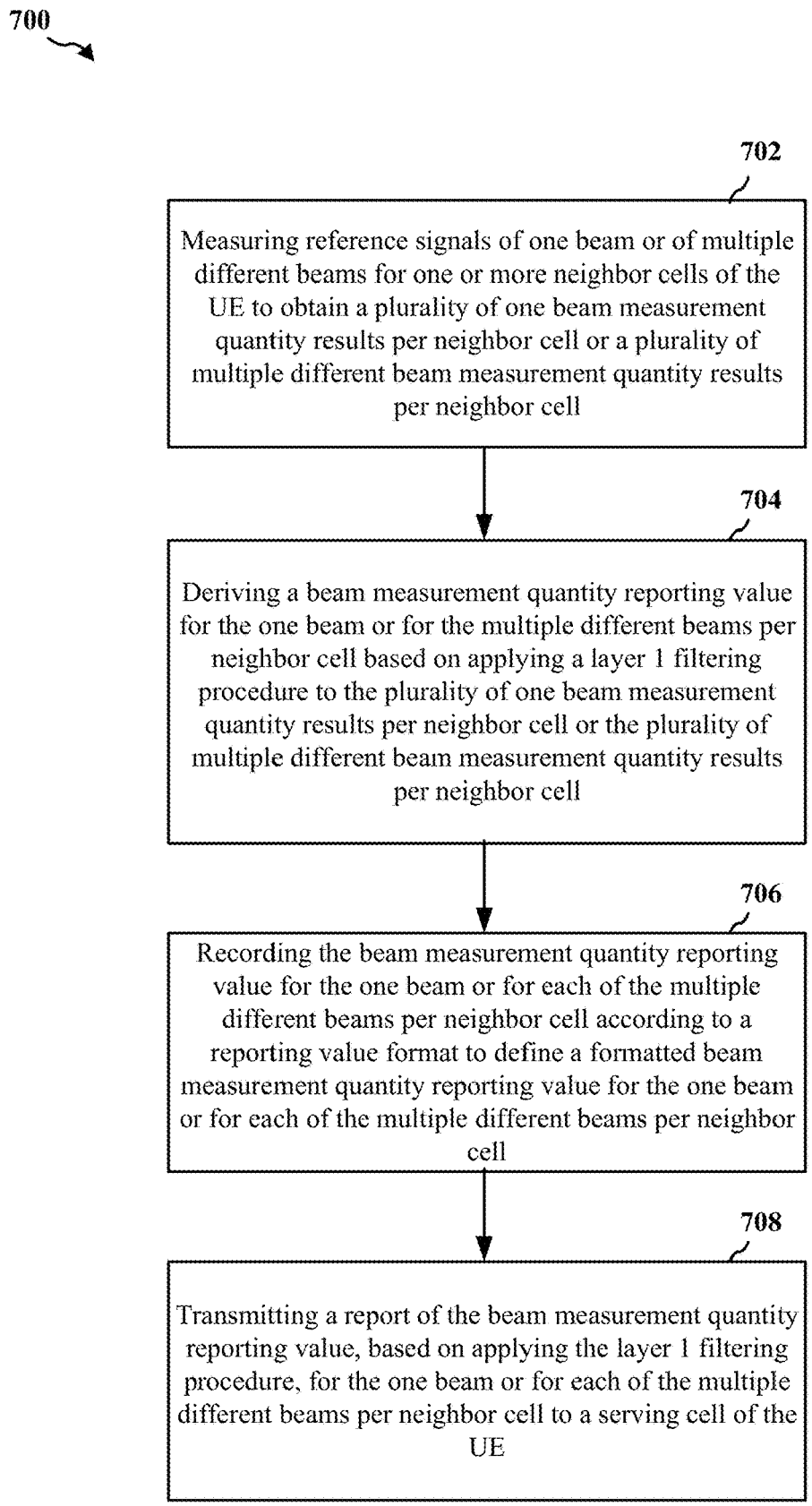
FIG. 7 is a flowchart of a method of wireless communication by a UE for reporting cell level L1 metrics for neighbor cells with special formatting according to the present aspects.

Referring to FIG. 7, flowchart 700 includes an example of a method of wireless communication performed by a UE, such as UE 104 as discussed above and/or having the architecture of FIG. 8, including reporting a specific format of cell level L1 metrics for neighbor cells such as for use in a fast cell change. As such, the method may be performed by a UE (e.g., the UE 104; the apparatus 350; the controller/processor 359, which may include the memory 360, processor(s) 712, memory 716, modem 740 and which may be the entire UE 104 or a component of the UE 104, such as the TX processor 368, the RX processor 356, and/or the transceiver 702) in combination with the communication component 198/configuration component 240.

At 702, method 700 includes measuring reference signals of one beam or of multiple different beams for one or more neighbor cells of the UE to obtain a plurality of one beam measurement quantity results per neighbor cell or a plurality of multiple different beam measurement quantity results per neighbor cell. In an aspect, the UE 104, the neighbor cell L1 metric component 198, the L1 metric measurement component 502, the RF front end 888, the transceiver 802 or receiver 806, the modem 840, the processor 812 and/or the memory 816 may be configured to measure reference signals of one beam or of multiple different beams for one or more neighbor cells of the UE to obtain a plurality of one beam measurement quantity results per neighbor cell or a plurality of multiple different beam measurement quantity results per neighbor cell. As such, the UE 104 and/or one or more of the above-noted components may define a means for measuring reference signals of one beam or of multiple different beams for one or more neighbor cells of the UE to obtain a plurality of one beam measurement quantity results per neighbor cell or a plurality of multiple different beam measurement quantity results per neighbor cell. For example, the actions at 702 may be performed in a manner as described above with reference to FIG. 4 and FIG. 5.

In some cases, measuring reference signals for the one beam or for the multiple different beams for the one or more neighbor cells comprises measuring synchronization signal blocks (SSBs) or measuring channel state information reference signals (CSI-RSs).

In some cases, the plurality of one beam measurement quantity results per neighbor cell or the plurality of multiple different beam measurement quantity results per neighbor cell comprise reference signal received power (RSRP) values, reference signal received quality (RSRQ) values, signal to noise and interference ratio (SINR) values, or any combination thereof.

At 704, method 700 includes deriving a beam measurement quantity reporting value for the one beam or for the multiple different beams per neighbor cell based on applying a layer 1 filtering procedure to the plurality of one beam measurement quantity results per neighbor cell or the plurality of multiple different beam measurement quantity results per neighbor cell. In an aspect, the UE 104, the neighbor cell L1 metric component 198, the metric value comparator component 508, the maximum number consolidator component 512, the reporting value determiner component 516, the modem 840, the processor 812 and/or the memory 816 may be configured to derive a beam measurement quantity reporting value for the one beam or for the multiple different beams per neighbor cell based on applying a layer 1 filtering procedure to the plurality of one beam measurement quantity results per neighbor cell or the plurality of multiple different beam measurement quantity results per neighbor cell. As such, the UE 104 and/or one or more of the above-noted components may define a means for deriving a beam measurement quantity reporting value for the one beam or for the multiple different beams per neighbor cell based on applying a layer 1 filtering procedure to the plurality of one beam measurement quantity results per neighbor cell or the plurality of multiple different beam measurement quantity results per neighbor cell. For example, the actions at 704 may be performed in a manner as described above with reference to FIG. 4 and FIG. 5.

In an implementation, the deriving according to the layer 1 filtering procedure includes determining the beam measurement quantity reporting value for the one beam or for each of the multiple different beams per neighbor cell as a highest value one of the plurality of one beam measurement quantity results per neighbor cell or each of the plurality of multiple different beam measurement quantity results per neighbor cell if: a layer 1 maximum number of beam measurements to be averaged threshold is not configured; or if a layer 1 beam measurement value threshold for consolidation is not configured; or if the highest value one of the plurality of one beam measurement quantity results per neighbor cell or each of the plurality of multiple different beam measurement quantity results per neighbor cell per neighbor cell is below or equal to the layer 1 beam measurement value threshold for consolidation.

Otherwise (e.g., else), the deriving according to the layer 1 filtering procedure includes determining the beam measurement quantity reporting value for the one beam or for each of the multiple different beams per neighbor cell as a linear power scale average of highest value ones of the plurality of one beam measurement quantity results per neighbor cell or the plurality of multiple different beam measurement quantity results per neighbor cell above the layer 1 measurement value threshold for consolidation, where a total number of averaged ones of the plurality of one beam measurement quantity results per neighbor cell or the plurality of multiple different beam measurement quantity results per neighbor cell does not exceed the layer 1 maximum number of measurements to be averaged threshold.

In some cases, deriving the beam measurement quantity reporting value for the one beam or for the multiple different beams per neighbor cell comprises deriving a single beam measurement quantity reporting value per neighbor cell.

Further, in some cases, the plurality of one beam measurement quantity results per neighbor cell or the plurality of multiple different beam measurement quantity results per neighbor cell are associated with a respective reference signal identifier (RS ID), and deriving the beam measurement quantity reporting value for the one beam or for the multiple different beams per neighbor cell further comprises associating the respective RS ID to each beam measurement quantity reporting value for each reference signal per neighbor cell.

At 706, method 700 includes recording the beam measurement quantity reporting value for the one beam or for each of the multiple different beams per neighbor cell according to a reporting value format to define a formatted beam measurement quantity reporting value for the one beam or for each of the multiple different beams per neighbor cell. In an aspect, the UE 104, the neighbor cell L1 metric component 198, the reporting value determiner component 516, the modem 840, the processor 812 and/or the memory 816 may be configured to record the beam measurement quantity reporting value for the one beam or for each of the multiple different beams per neighbor cell according to a reporting value format to define a formatted beam measurement quantity reporting value for the one beam or for each of the multiple different beams per neighbor cell. As such, the UE 104 and/or one or more of the above-noted components may define a means for recording the beam measurement quantity reporting value for the one beam or for each of the multiple different beams per neighbor cell according to a reporting value format to define a formatted beam measurement quantity reporting value for the one beam or for each of the multiple different beams per neighbor cell. For example, the actions at 706 may be performed in a manner as described above with reference to FIG. 4 and FIG. 5.

In some cases, the recording of the beam measurement quantity reporting value according to the reporting value format includes changing each beam measurement quantity reporting value to an absolute value.

In some cases, the recording of the beam measurement quantity reporting value according to the reporting value format includes changing each beam measurement quantity reporting value to a quantized value.

In some cases, the recording of the beam measurement quantity reporting value according to the reporting value format includes changing a highest beam measurement quantity reporting value of all reported cells to an absolute value, and changing each beam measurement quantity reporting value of each remaining reported cell to a differential value with respect to the absolute value.

In some cases, the recording of the beam measurement quantity reporting value according to the reporting value format includes changing a highest beam measurement quantity reporting value of all reported cells to a quantized value, and changing each beam measurement quantity reporting value of each remaining reported cell to a differential value with respect to the quantized value.

At 708, method 700 includes transmitting a report of the beam measurement quantity reporting value, based on applying the layer 1 filtering procedure, for the one beam or for each of the multiple different beams per neighbor cell to a serving cell of the UE. In an aspect, the UE 104, the neighbor cell L1 metric component 198, the L1 metric measurement component 502, the RF front end 888, the transceiver 802 or transmitter 808, the modem 840, the processor 812 and/or the memory 816 may be configured to transmit a report of the beam measurement quantity reporting value, based on applying the layer 1 filtering procedure, for the one beam or for each of the multiple different beams per neighbor cell to a serving cell of the UE. As such, the UE 104 and/or one or more of the above-noted components may define a means for transmitting a report of the beam measurement quantity reporting value, based on applying the layer 1 filtering procedure, for the one beam or for each of the multiple different beams per neighbor cell to a serving cell of the UE. For example, the actions at 708 may be performed in a manner as described above with reference to FIG. 4 and FIG. 5.

In some implementations, the method 700 may alternatively or additionally include receiving a cell switch command indicating a target neighbor cell based on the report of the beam measurement quantity reporting value for the one beam or for each of the multiple different beams per neighbor cell, and switching a communication connection from the serving cell to the target neighbor cell. In some cases, the cell switch command further indicates a target beam, and switching the communication connection includes switching to receiving the target beam.

Figure 8:
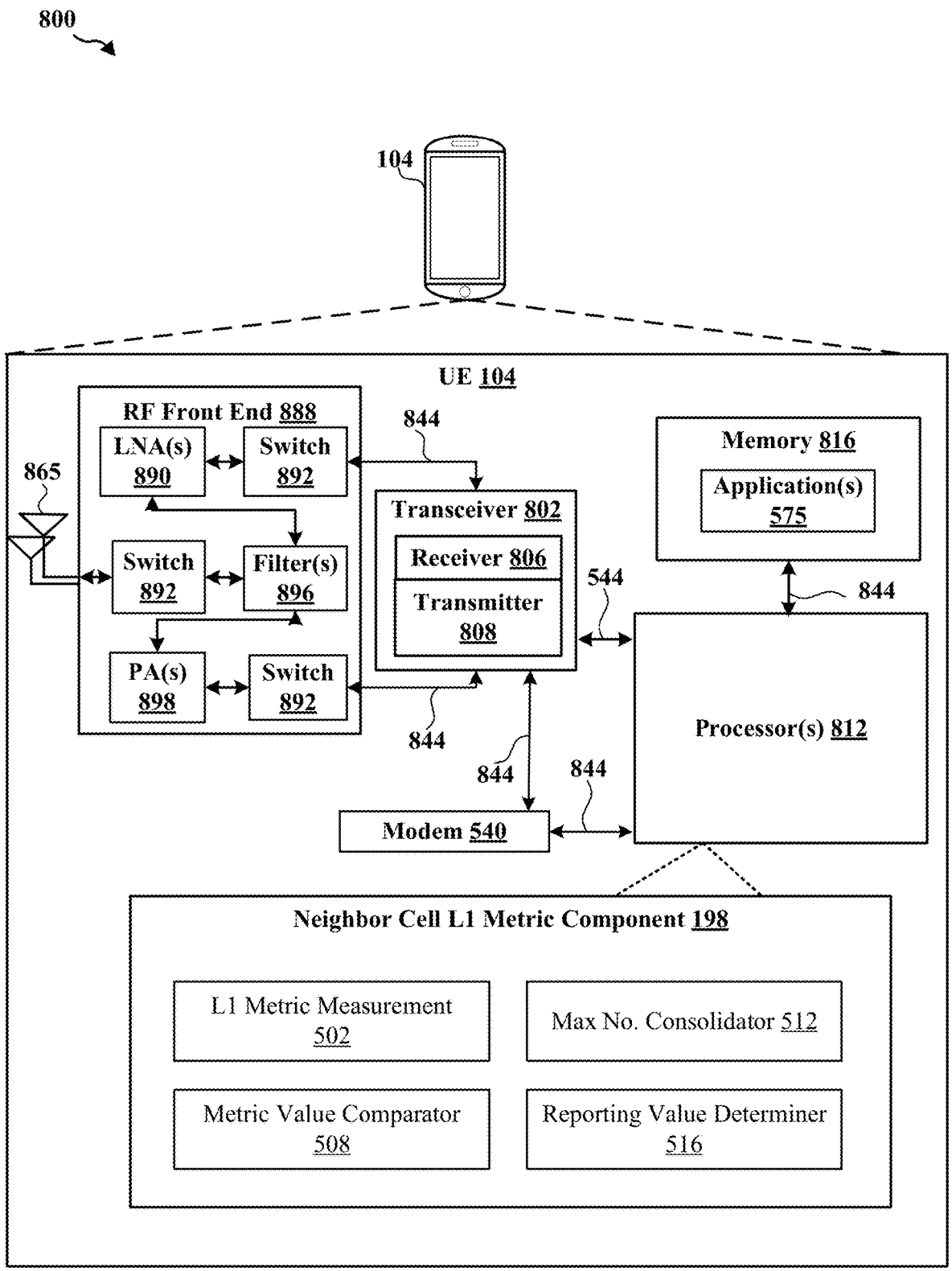
FIG. 8 is a block diagram illustrating an example of a UE, in accordance with various aspects of the present disclosure.

Referring to FIG. 8, one example of an implementation of UE 104 may include a variety of components, some of which have already been described above and are described further herein, including components such as one or more processors 812 and memory 816 and transceiver 802 in communication via one or more buses 844, which may operate in conjunction with modem 840 and/or neighbor cell L1 metric component 198 for performing the actions described herein.

In an aspect, the one or more processors 812 can include a modem 840 and/or can be part of the modem 840 that uses one or more modem processors. Thus, the various functions related to neighbor cell L1 metric component 198 may be included in modem 840 and/or processors 812 and, in an aspect, can be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 840 associated with neighbor cell L1 metric component 198 may be performed by transceiver 802.

In addition, memory 816 may be configured to store data used herein and/or local versions of applications 875 or neighbor cell L1 metric component 198 and/or one or more of its subcomponents being executed by at least one processor 812. Memory 816 can include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining neighbor cell L1 metric component 198 and/or one or more of its subcomponents, and/or data associated therewith, when UE 104 is operating at least one processor 812 to execute neighbor cell L1 metric component 198 and/or one or more of its subcomponents.

Transceiver 802 may include at least one receiver 806 and at least one transmitter 808. Receiver 806 may include hardware and/or software executable by a processor for receiving data, the code comprising instructions and being stored in a memory (e.g., computer-readable medium). Receiver 806 may be, for example, a radio frequency (RF) receiver. In an aspect, receiver 806 may receive signals transmitted by at least one base station 102. Additionally, receiver 806 may process such received signals, and also may obtain measurements of the signals, such as, but not limited to, Ec/Io, signal-to-noise ratio (SNR), signal and interference to noise ratio (SINR), reference signal received power (RSRP), reference signal received quality (RSRQ), received signal strength indicator (RSSI), etc. Transmitter 808 may include hardware and/or software executable by a processor for transmitting data, the code comprising instructions and being stored in a memory (e.g., computer-readable medium). A suitable example of transmitter 808 may including, but is not limited to, an RF transmitter.

Moreover, in an aspect, UE 104 may include RF front end 888, which may operate in communication with one or more antennas 865 and transceiver 802 for receiving and transmitting radio transmissions, for example, wireless communications transmitted by at least one base station 102 or wireless transmissions transmitted by UE 104. RF front end 888 may be connected to one or more antennas 865 and can include one or more low-noise amplifiers (LNAs) 890, one or more switches 892, one or more power amplifiers (PAs) 898, and one or more filters 896 for transmitting and receiving RF signals. The one or more antennas 865 may include one or more antenna arrays or one or more antenna panels, such as may be used for transmitting/receiving beamformed signals.

In an aspect, LNA 890 can amplify a received signal at a desired output level. In an aspect, each LNA 890 may have a specified minimum and maximum gain values. In an aspect, RF front end 888 may use one or more switches 892 to select a particular LNA 890 and its specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and its specified gain value based on a desired gain value for a particular application.

Also, for example, one or more filters 896 can be used by RF front end 888 to filter a received signal to obtain an input RF signal. Similarly, in an aspect, for example, a respective filter 896 can be used to filter an output from a respective PA 898 to produce an output signal for transmission. In an aspect, each filter 896 can be connected to a specific LNA 890 and/or PA 898. In an aspect, RF front end 888 can use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 865 via RF front end 888. In an aspect, transceiver may be tuned to operate at specified frequencies such that UE 104 can communicate with, for example, one or more base stations 102 or one or more cells associated with one or more base stations 102. In an aspect, for example, modem 840 can configure transceiver 802 to operate at a specified frequency and power level based on the UE configuration of the UE 104 and the communication protocol used by modem 840.

In an aspect, modem 840 can be a multiband-multimode modem, which can process digital data and communicate with transceiver 802 such that the digital data is sent and received using transceiver 802. In an aspect, modem 840 can be multiband and be configured to support multiple frequency bands for a specific communications protocol. In an aspect, modem 840 can be multimode and be configured to support multiple operating networks and communications protocols. In an aspect, modem 840 can control one or more components of UE 104 (e.g., RF front end 888, transceiver 802) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 812 may correspond to one or more of the processors described in connection with the UE in FIG. 3. Similarly, the memory 816 may correspond to the memory described in connection with the UE in FIG. 3.

Figure 9:
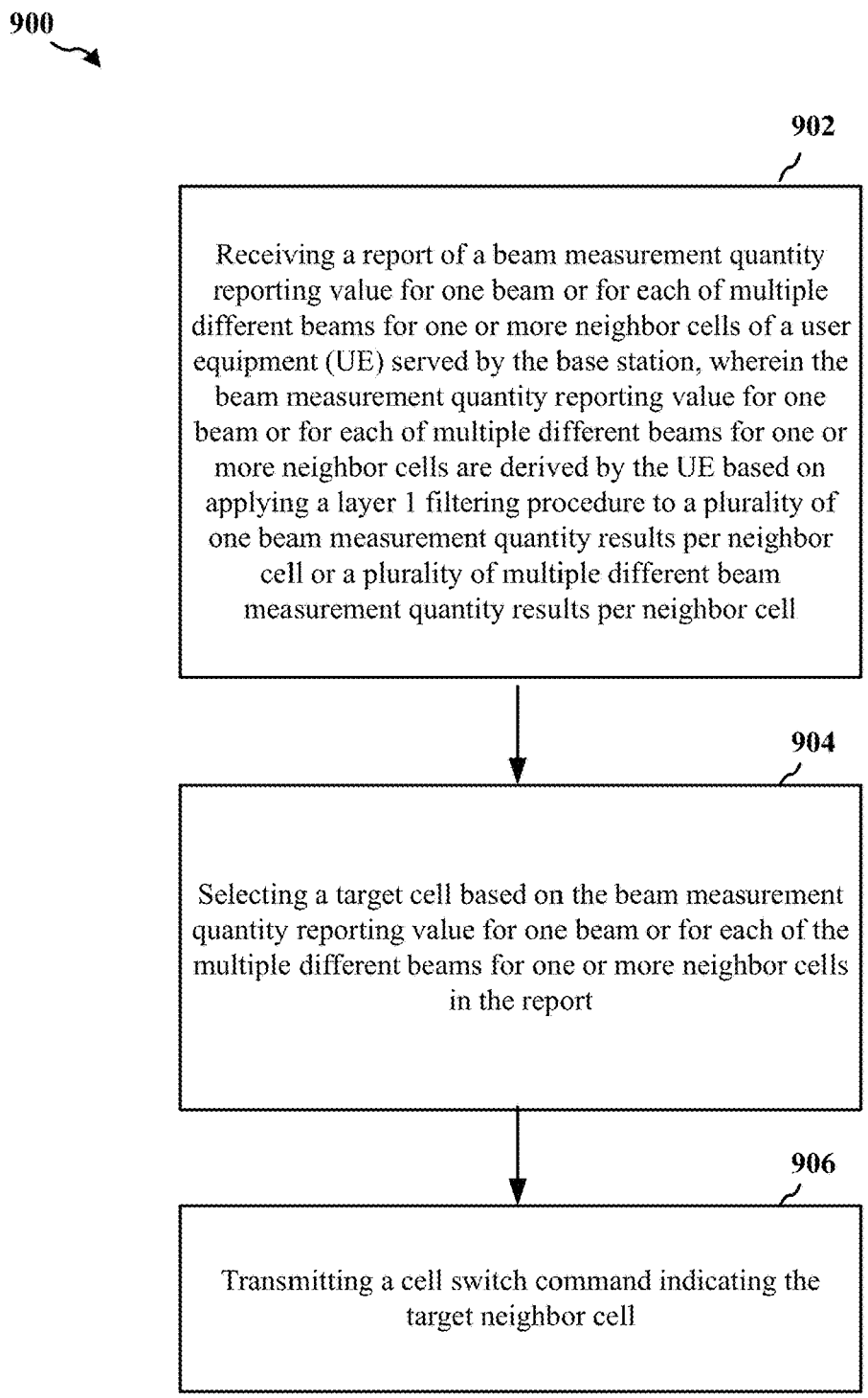
FIG. 9 is a flowchart of a method of wireless communication by a base station or cell using reported cell level L1 metrics for neighbor cells according to the present aspects.

FIG. 9 is a flowchart 900 of a method of wireless communication performed by a base station or cell, such as base station 102 or serving cell 416 as discussed above and/or having the architecture of FIG. 11, including utilizing reported cell level L1 metrics for neighbor cells for use in a fast cell change. As such, the method may be performed by a base station or cell (e.g., the base station 102, the apparatus 310; the controller/processor 375 and/or the memory 376, the TX processor 316, the RX processor 370, the transceiver 1102, processor(s) 1112 and/or memory 1116, or modem 1140), which may be the entire base station 102 or serving cell 416 or one or more components of base station 102 or serving cell 416 in combination with the cell management component 199.

At 902, method 900 includes receiving a report of a beam measurement quantity reporting value for one beam or for each of multiple different beams for one or more neighbor cells of a user equipment (UE) served by the base station, wherein the beam measurement quantity reporting value for one beam or for each of multiple different beams for one or more neighbor cells are derived by the UE based on applying a layer 1 filtering procedure to a plurality of one beam measurement quantity results per neighbor cell or a plurality of multiple different beam measurement quantity results per neighbor cell. In an aspect, the base station 102 or serving cell 416 in combination with the cell management component 199, antennas 1165, RF front end 1188, transceiver 1102 or receiver 1106, modem 1140, processor(s) 1112 and/or memory 1116, and/or any combination of the base station/cell components may be configured to perform this action. As such, the base station 102 or serving cell 416 in combination with the cell management component 199 and/or one or more of the above-noted components may define a means for receiving a report of a beam measurement quantity reporting value for one beam or for each of multiple different beams for one or more neighbor cells of a user equipment (UE) served by the base station, wherein the beam measurement quantity reporting value for one beam or for each of multiple different beams for one or more neighbor cells are derived by the UE based on applying a layer 1 filtering procedure to a plurality of one beam measurement quantity results per neighbor cell or a plurality of multiple different beam measurement quantity results per neighbor cell. For example, the actions at 902 may be performed in a manner as described above with reference to FIG. 4 and FIG. 5.

At 904, method 900 includes selecting a target cell based on the beam measurement quantity reporting value for one beam or for each of the multiple different beams for one or more neighbor cells in the report. In an aspect, the base station 102 or serving cell 416 in combination with the cell management component 199 and/or the modem 1140, the processor 1112 and/or the memory 1116 may be configured to perform this action. As such, the base station 102 or serving cell 416 in combination with the cell management component 199 and/or one or more of the above-noted components may define means for selecting a target cell based on the beam measurement quantity reporting value for one beam or for each of the multiple different beams for one or more neighbor cells in the report. For example, the actions at 904 may be performed in a manner as described above with reference to FIG. 4 and FIG. 5.

At 906, method 900 includes transmitting a cell switch command indicating the target neighbor cell. In an aspect, the base station 102 or serving cell 416 in combination with the cell management component 199 and/or the modem 1140, the processor 1112 and/or the memory 1116 may be configured to perform this action. As such, the base station 102 or serving cell 416 in combination with the cell management component 199 and/or one or more of the above-noted components may define means for transmitting a cell switch command indicating the target neighbor cell. For example, the actions at 906 may be performed in a manner as described above with reference to FIG. 4 and FIG. 5.

In some implementations, the cell switch command further indicates a target beam from the report of the beam measurement quantity reporting value for the one beam or for each of the multiple different beams for one or more neighbor cells.

In some implementations, the method 900 may alternatively or additionally include transmitting a configuration indicating one or more of the layer 1 maximum number of beam measurements to be averaged threshold, the layer 1 beam measurement value threshold for consolidation, a measurement quantity type, or a reference signal type.

Figure 10:
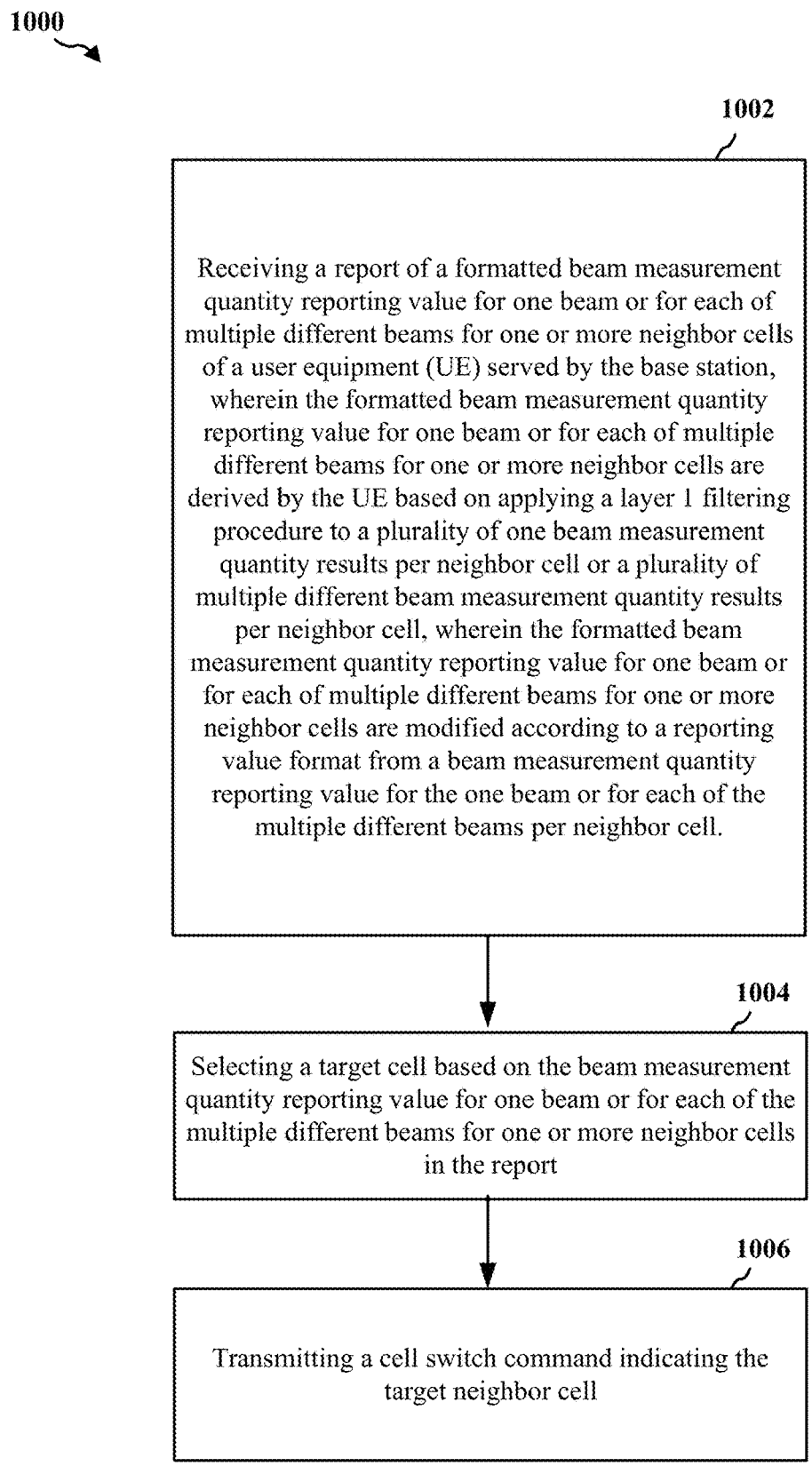
FIG. 10 is a flowchart of a method of wireless communication by a base station or cell using reported cell level L1 metrics for neighbor cells with special formatting according to the present aspects.

Referring to FIG. 10, flowchart 1000 includes an example of a method of wireless communication performed by a base station or cell, such as base station 102 or serving cell 416 as discussed above and/or having the architecture of FIG. 11, including utilizing specially-formatted reported cell level L1 metrics for neighbor cells for use in a fast cell change. As such, the method may be performed by a base station or cell (e.g., the base station 102, the apparatus 310; the controller/processor 375 and/or the memory 376, the TX processor 316, the RX processor 370, the transceiver 1102, processor(s) 1112 and/or memory 1116, or modem 1140), which may be the entire base station 102 or serving cell 416 or one or more components of base station 102 or serving cell 416 in combination with the cell management component 199.

At 1002, method 1000 includes receiving a report of a formatted beam measurement quantity reporting value for one beam or for each of multiple different beams for one or more neighbor cells of a user equipment (UE) served by the base station, wherein the formatted beam measurement quantity reporting value for one beam or for each of multiple different beams for one or more neighbor cells are derived by the UE based on applying a layer 1 filtering procedure to a plurality of one beam measurement quantity results per neighbor cell or a plurality of multiple different beam measurement quantity results per neighbor cell, and wherein the formatted beam measurement quantity reporting value for one beam or for each of multiple different beams for one or more neighbor cells are modified according to a reporting value format from a beam measurement quantity reporting value for the one beam or for each of the multiple different beams per neighbor cell. In an aspect, the base station 102 or serving cell 416 in combination with the cell management component 199, antennas 1165, RF front end 1188, transceiver 1102 or receiver 1106, modem 1140, processor(s) 1112 and/or memory 1116, and/or any combination of the base station/cell components may be configured to perform this action. As such, the base station 102 or serving cell 416 in combination with the cell management component 199 and/or one or more of the above-noted components may define a means for receiving a report of a formatted beam measurement quantity reporting value for one beam or for each of multiple different beams for one or more neighbor cells of a user equipment (UE) served by the base station, wherein the formatted beam measurement quantity reporting value for one beam or for each of multiple different beams for one or more neighbor cells are derived by the UE based on applying a layer 1 filtering procedure to a plurality of one beam measurement quantity results per neighbor cell or a plurality of multiple different beam measurement quantity results per neighbor cell, and wherein the formatted beam measurement quantity reporting value for one beam or for each of multiple different beams for one or more neighbor cells are modified according to a reporting value format from a beam measurement quantity reporting value for the one beam or for each of the multiple different beams per neighbor cell. For example, the actions at 1002 may be performed in a manner as described above with reference to FIG. 4 and FIG. 5.

In some cases, the formatted beam measurement quantity reporting value for the one beam or for each of the multiple different beams per neighbor cell comprise a respective absolute value.

In some cases, the formatted beam measurement quantity reporting value for the one beam or for each of the multiple different beams per neighbor cell comprise a respective quantized value.

In some cases, the formatted beam measurement quantity reporting value for the one beam or for each of the multiple different beams per neighbor cell comprise an absolute value for a highest beam measurement quantity reporting value of all reported cells, and a respective differential value with respect to the absolute value for each beam measurement quantity reporting value of each remaining reported cell.

In some cases, the formatted beam measurement quantity reporting value for the one beam or for each of the multiple different beams per neighbor cell comprise a quantized value for a highest beam measurement quantity reporting value of all reported cells, and a respective differential value with respect to the quantized value for each beam measurement quantity reporting value of each remaining reported cell.

In some cases, the formatted beam measurement quantity reporting value for the one beam or for each of the multiple different beams per neighbor cell comprise a single beam measurement quantity reporting value per neighbor cell.

In some cases, the formatted beam measurement quantity reporting value for the one beam or for each of the multiple different beams per neighbor cell comprise a respective reference signal identifier (RS ID) associated with each formatted beam measurement quantity reporting value for each reference signal per neighbor cell.

At 1004, method 1000 includes selecting a target cell based on the beam measurement quantity reporting value for one beam or for each of the multiple different beams for one or more neighbor cells in the report. In an aspect, the base station 102 or serving cell 416 in combination with the cell management component 199 and/or the modem 1140, the processor 1112 and/or the memory 1116 may be configured to perform this action. As such, the base station 102 or serving cell 416 in combination with the cell management component 199 and/or one or more of the above-noted components may define means for selecting a target cell based on the beam measurement quantity reporting value for one beam or for each of the multiple different beams for one or more neighbor cells in the report. For example, the actions at 1004 may be performed in a manner as described above with reference to FIG. 4 and FIG. 5.

In an implementation, the cell switch command further indicates a target beam from the report of the formatted beam measurement quantity reporting value for the one beam or for each of the multiple different beams for one or more neighbor cells.

At 1006, method 1000 includes transmitting a cell switch command indicating the target neighbor cell. In an aspect, the base station 102 or serving cell 416 in combination with the cell management component 199 and/or the modem 1140, the processor 1112 and/or the memory 1116 may be configured to perform this action. As such, the base station 102 or serving cell 416 in combination with the cell management component 199 and/or one or more of the above-noted components may define means for transmitting a cell switch command indicating the target neighbor cell. For example, the actions at 1006 may be performed in a manner as described above with reference to FIG. 4 and FIG. 5.

In some implementations, the cell switch command further indicates a target beam from the report of the beam measurement quantity reporting value for the one beam or for each of the multiple different beams for one or more neighbor cells.

In some implementations, the method 900 may alternatively or additionally include transmitting a configuration indicating one or more of the layer 1 maximum number of beam measurements to be averaged threshold, the layer 1 beam measurement value threshold for consolidation, a measurement quantity type, or a reference signal type.

Figure 11:
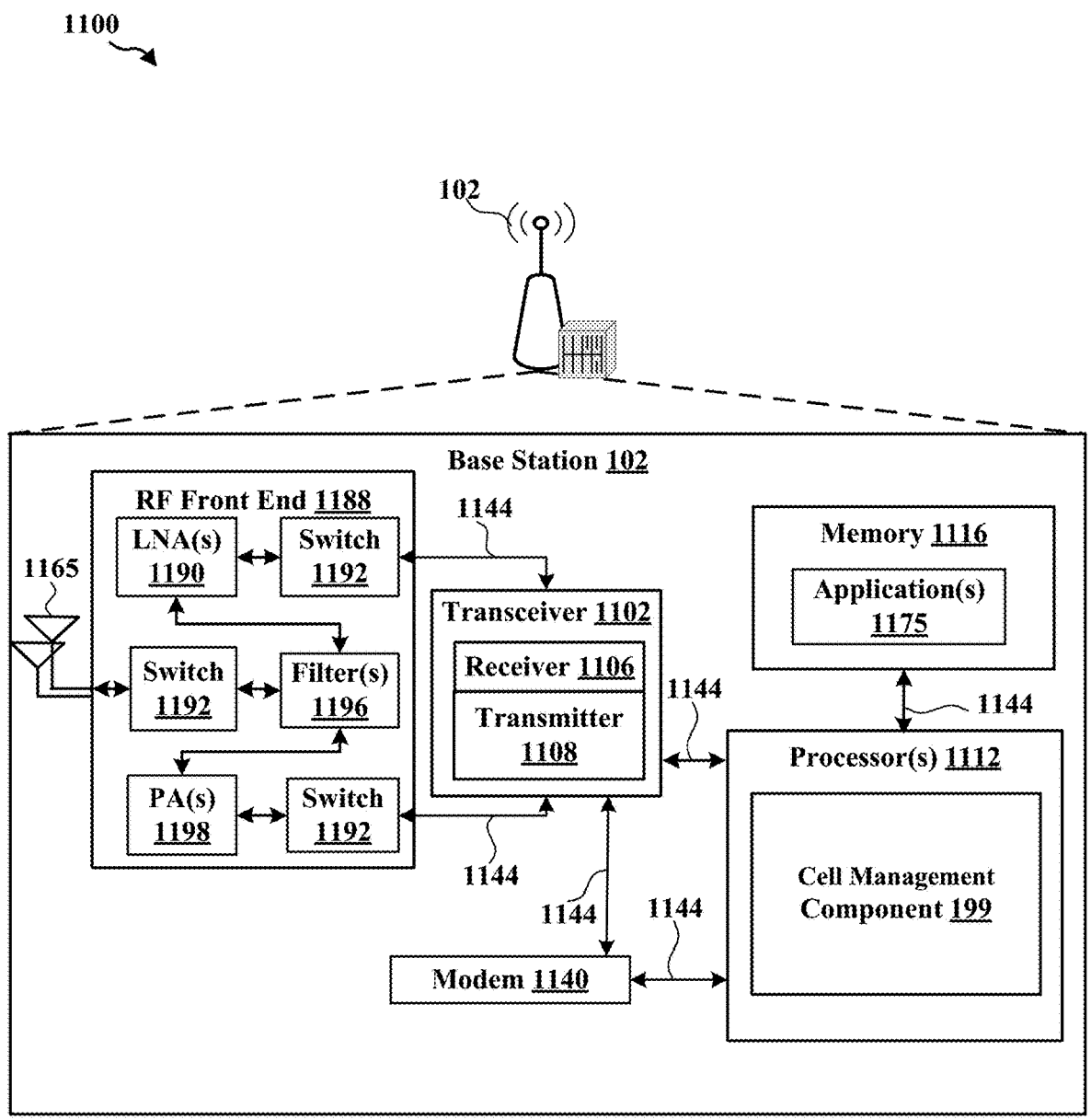
FIG. 11 is a block diagram illustrating an example of a base station or cell in accordance with various aspects of the present disclosure.

Referring to FIG. 11, one example of an implementation of base station 102 or cell may include a variety of components, some of which have already been described above, but including components such as one or more processors 1112 and memory 1116 and transceiver 1102 in communication via one or more buses 1144, which may operate in conjunction with modem 1140 and cell management component 199 for performing the actions described herein.

The transceiver 1102, receiver 1106, transmitter 1108, one or more processors 1112, memory 1116, applications 1175, buses 1144, RF front end 1188, LNAs 1190, switches 1192, filters 1196, PAs 1198, and one or more antennas 1165 may be the same as or similar to the corresponding components of UE 104, as described above, but configured or otherwise programmed for base station operations as opposed to UE operations.

In an aspect, the processor(s) 1112 may correspond to one or more of the processors described in connection with the base station in FIG. 3. Similarly, the memory 1116 may correspond to the memory described in connection with the base station in FIG. 3.

Figure 12:
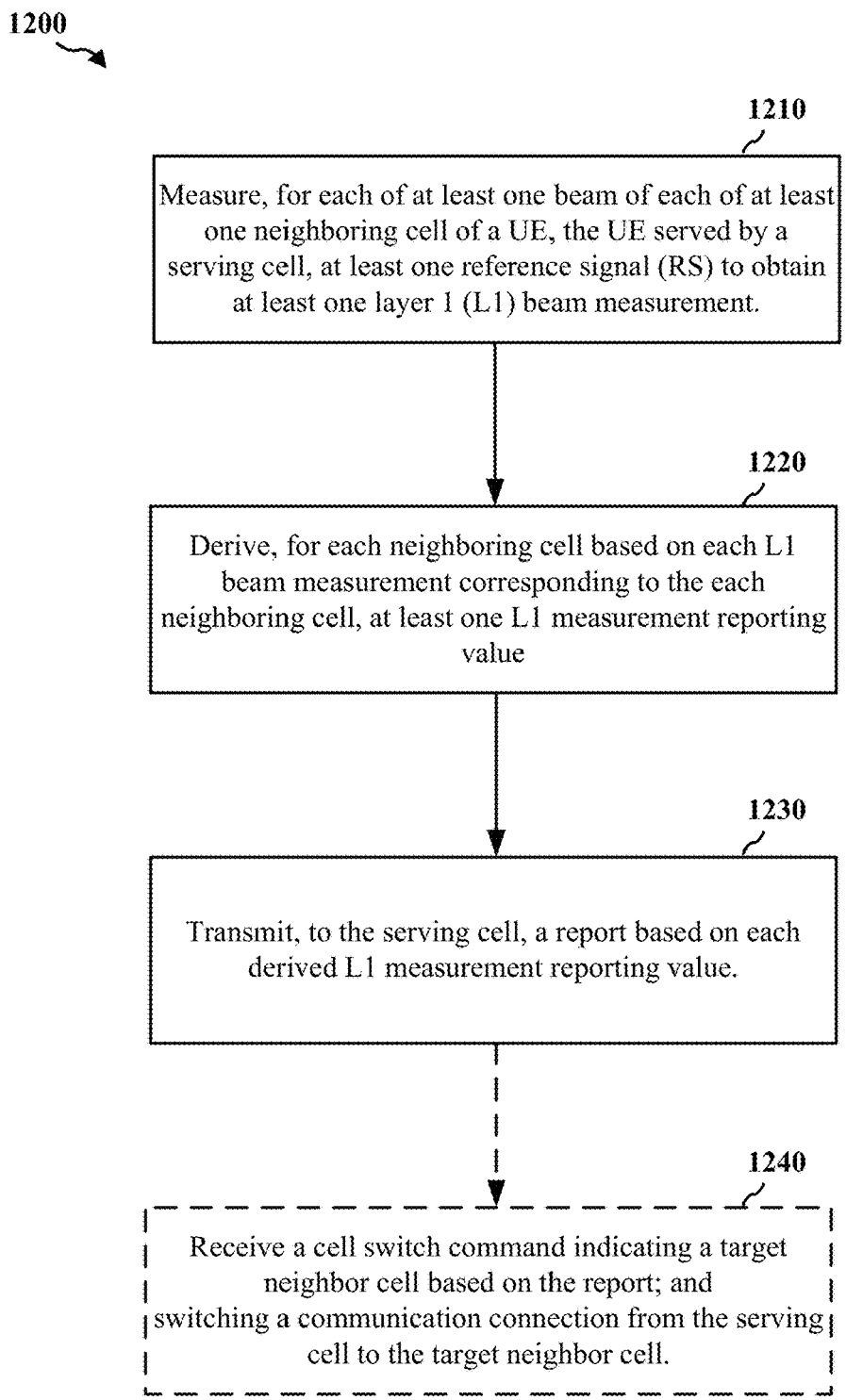
FIG. 12 is a flowchart of a method of wireless communication by a UE for reporting cell level L1 metrics for neighbor cells according to the present aspects.

Referring to FIG. 12, and continuing to refer to prior figures for context, a flowchart of methods 1200 of wireless communication by a UE for reporting cell level L1 metrics for neighbor cells according to the present aspects is shown. As such, the method 1200 may be performed by a UE (e.g., the UE 104, the apparatus 350; the controller/processor 359 and/or the memory 360, the TX processor 368, the RX processor 356, the transceiver 802, processor(s) 812 and/or memory 816, or modem 840), which may be the entire UE 104 one or more components of UE in combination with the neighbor cell L1 metric component 198.

In such methods 1200, a UE 104 served by a serving cell measures, for each of at least one beam of each of at least one neighboring cell of the UE 104, at least one reference signal (RS) to obtain at least one L1 beam measurement—Block 1210. In a continuing example, UE 104, the neighbor cell L1 metric component 198, the L1 metric measurement component 502, the RF front end 888, the transceiver 802 or receiver 806, the modem 840, the processor 812 and/or the memory 816 may be configured to measure, for each of at least one beam of each of at least one neighboring cell of a UE 104, at least one reference signal (RS) to obtain at least one layer 1 (L1) beam measurement. As such, the UE 104 and/or one or more of the above-noted components may define a means for measuring, for each of at least one beam of each of at least one neighboring cell of a UE 104, at least one reference signal (RS) to obtain at least one layer 1 (L1) beam measurement. For example, the actions at 1210 may be performed in a manner as described above with reference to FIG. 4 and FIG. 5.

In some aspects the at least one beam measurement includes one or more of a reference signal received power (RSRP), a reference signal received quality (RSRQ), or a signal-to-interference-plus-noise ratio (SINR). In some aspects measuring includes measuring for less than or equal to 100 ms. In some aspects measuring at least one reference signal includes measuring at least one synchronization signal block (SSB). In some aspects, measuring at least one reference signal includes measuring at least one channel state information reference signal (CSI-RS). In some aspects, measuring at least one reference signal includes measuring for a configured number of neighbor cells.

In such methods 1200, the UE derives, for each neighboring cell based on each L1 beam measurement corresponding to the each neighboring cell, at least one L1 measurement reporting value—Block 1220. In the continuing example, the UE 104, the neighbor cell L1 metric component 198, the metric value comparator component 508, the maximum number consolidator component 512, the reporting value determiner component 516, the modem 840, the processor 812 and/or the memory 816 may be configured to derives, for each neighboring cell based on each L1 beam measurement corresponding to the each neighboring cell, at least one L1 measurement reporting value. As such, the UE 104 and/or one or more of the above-noted components may define a means for deriving, for each neighboring cell based on each L1 beam measurement corresponding to the each neighboring cell, at least one L1 measurement reporting value. For example, the actions at 1220 may be performed in a manner as described above with reference to FIG. 4 and FIG. 5.

In some aspects, the at least one L1 measurement reporting value is a cell-level L1 beam measurement reporting value for each at least one neighboring cell, and wherein each cell-level L1 beam measurement reporting value corresponds to a beam measurement for one of X neighboring cells. In some aspects the at least one L1 measurement reporting value is a beam level L1 beam measurement reporting value for each beam of each neighboring cell, and wherein each beam-level L1 beam measurement reporting value reports a beam measurement for one of up to Y RS identifications (RS IDs) per cell. In some aspects, the deriving excludes level 3 (L3) filtering.

In some such aspects, deriving, for each neighboring cell, at least one L1 measurement reporting value, includes determining one of i) a highest value beam measurement as the at least one L1 reporting value; and ii) a linear power scale average of a plurality of highest value beam measurements above an L1 layer 1 measurement value threshold for consolidation as the at least one L1 measurement reporting value. In some such aspects, determining one of the highest value beam measurement and the linear power scale average as the at least one L1 measurement reporting value includes determining the highest value L1 beam measurement as the at least one L1 measurement reporting value if i) an L1 maximum number of beam measurements to be averaged threshold is not configured, or ii) an L1 beam measurement value threshold for consolidation is not configured; or ii) the highest value beam measurement is below or equal to a configured layer 1 beam measurement value threshold for consolidation; else determining the linear power scale average as the at least one L1 measurement reporting value.

In some aspects, the UE receives a configuration indicating one or more of: the L1 maximum number of beam measurements to be averaged threshold, the L1 beam measurement value threshold for consolidation, a measurement quantity type, or an RS type to be measured. In some aspects, a number of beam measurements used in determining the linear power scale average as the at least one L1 measurement reporting value does not exceed a configured L1 maximum number of beam measurements to be averaged threshold.

In such methods 1200, the UE transmits, to the serving cell, a report based on each derived L1 measurement reporting value—Block 1230. In the continuing example, the UE 104, the neighbor cell L1 metric component 198, the L1 metric measurement component 502, the RF front end 888, the transceiver 802 or transmitter 808, the modem 840, the processor 812 and/or the memory 816 may be configured to transmit, to the serving cell, a report based on each derived L1 measurement reporting value. As such, the UE 104 and/or one or more of the above-noted components may define a means for, transmitting, to the serving cell, a report based on each derived L1 measurement reporting value. For example, the actions at 708 may be performed in a manner as described above with reference to FIG. 4 and FIG. 5.

In some such methods 1200, the UE receives a cell switch command indicating a target neighbor cell based on the report, and switches a communication connection from the serving cell to the target neighbor cell—Block 1240. In the continuing example, the UE 104, the neighbor cell L1 metric component 198, the L1 metric measurement component 502, the RF front end 888, the transceiver 802 or transmitter 808, the modem 840, the processor 812 and/or the memory 816 may be configured to receive a cell switch command indicating a target neighbor cell based on the report, and switch a communication connection from the serving cell to the target neighbor cell. As such, the UE 104 and/or one or more of the above-noted components may define a means for, receiving a cell switch command indicating a target neighbor cell based on the report, and switching a communication connection from the serving cell to the target neighbor cell. For example, the actions at 708 may be performed in a manner as described above with reference to FIG. 4 and FIG. 5. In some such methods, the cell switch command further indicates a target beam of the target cell, and wherein switching the communication connection includes switching to receiving the target beam.

Figure 13:
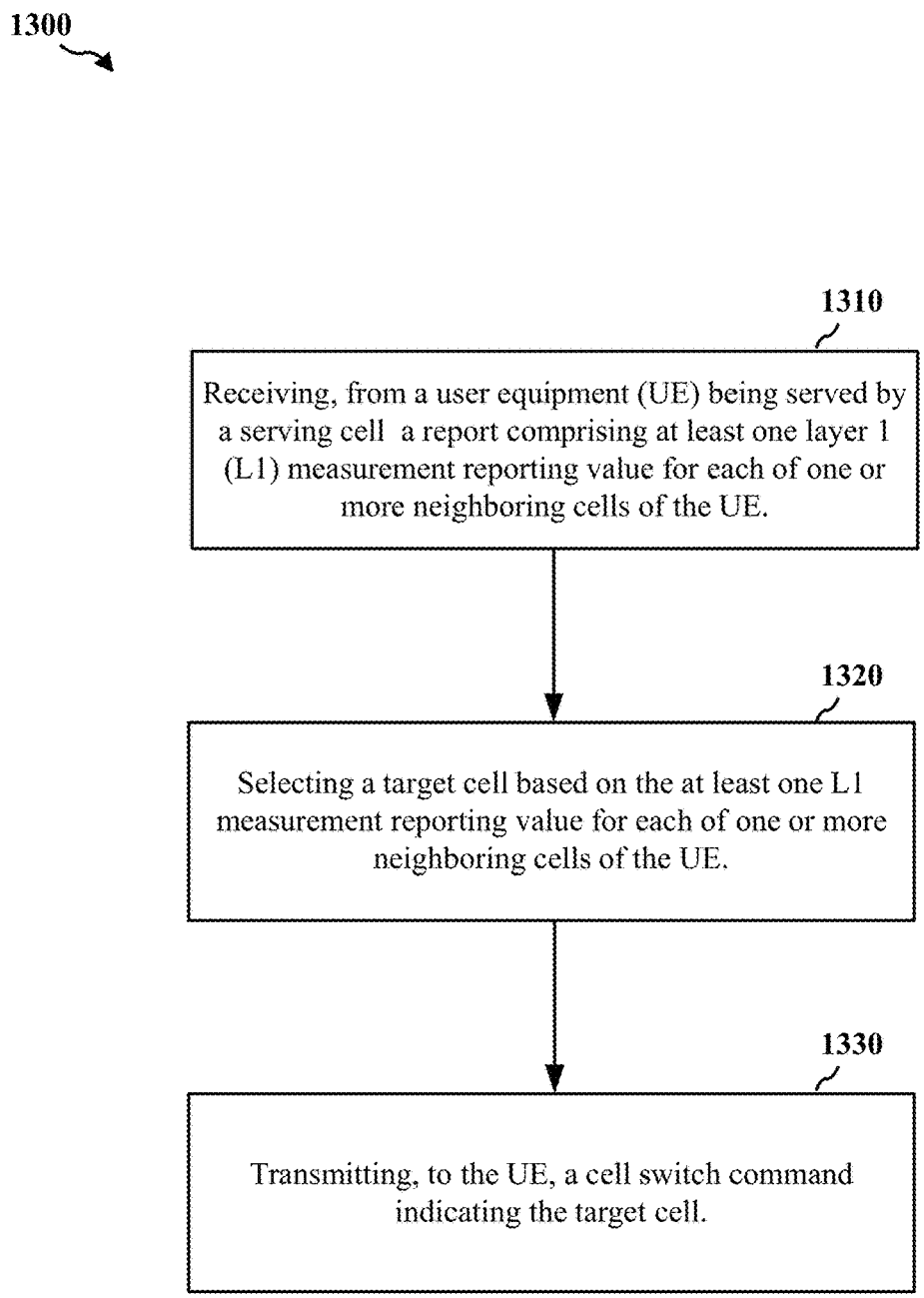
FIG. 13 is a flowchart of a method of wireless communication by a base station or cell using reported cell level L1 metrics for neighbor cells according to the present aspects.

Referring to FIG. 13, and continuing to refer to prior figures for context, a flowchart of methods 1300 of wireless communication by a base station or cell using reported cell level L1 metrics for neighbor cells according to the present aspects is shown. As such, the method 1300 may be performed by a base station or cell (e.g., the base station 102, the apparatus 310; the controller/processor 375 and/or the memory 376, the TX processor 316, the RX processor 370, the transceiver 1102, processor(s) 1112 and/or memory 1116, or modem 1140), which may be the entire base station 102 or serving cell 416 or one or more components of base station 102 or serving cell 416 in combination with the cell management component 199.

In such methods 1300, a serving cell receives, from a UE being served by the serving cell, a report comprising at least one L1 measurement reporting value for each of one or more neighboring cells of the UE—Block 1310. In some aspects, the base station 102 or serving cell 416 in combination with the cell management component 199, antennas 1165, RF front end 1188, transceiver 1102 or receiver 1106, modem 1140, processor(s) 1112 and/or memory 1116, and/or any combination of the base station/cell components may be configured to perform this action. As such, the base station 102 or serving cell 416 in combination with the cell management component 199 and/or one or more of the above-noted components may define a means for receiving, from a UE being served by a serving cell a report comprising at least one L1 measurement reporting value for each of one or more neighboring cells of the UE. For example, the actions at 902 may be performed in a manner as described above with reference to FIG. 4 and FIG. 5. In some aspects, each at least one L1 measurement reporting value is a function of at least one beam measurement i) at the UE, and ii) based on at least one reference signal (RS) of at least one beam of each of at least one neighboring cell of the UE.

The method 1300 further includes selecting a target cell based on the at least one L1 measurement reporting value for each of one or more neighboring cells of the UE—Block 1320. In some aspects, the base station 102 or serving cell 416 in combination with the cell management component 199 and/or the modem 1140, the processor 1112 and/or the memory 1116 may be configured to perform this action. As such, the base station 102 or serving cell 416 in combination with the cell management component 199 and/or one or more of the above-noted components may define means for selecting a target cell based on the at least one L1 measurement reporting value for each of one or more neighboring cells of the UE. For example, the actions at 904 may be performed in a manner as described above with reference to FIG. 4 and FIG. 5.

The method 1300 further includes transmitting, to the UE, a cell switch command indicating the target cell—Block 1330. In some aspects, the base station 102 or serving cell 416 in combination with the cell management component 199 and/or the modem 1140, the processor 1112 and/or the memory 1116 may be configured to perform this action. As such, the base station 102 or serving cell 416 in combination with the cell management component 199 and/or one or more of the above-noted components may define means for transmitting, to the UE, a cell switch command indicating the target cell. For example, the actions at 906 may be performed in a manner as described above with reference to FIG. 4 and FIG. 5. In some aspects, the cell switch command further indicates at least one target beam of the target cell.

As an additional example #1, methods, apparatuses (including apparatuses comprising means for performing the features of the method), and computer program product for serving cell change faster than L3 serving cell change are disclosed herein. In such examples, a UE served by a base station measures reference signals of one beam or of multiple different beams for one or more neighbor cells of the UE to obtain a plurality of one beam measurement quantity results per neighbor cell or a plurality of multiple different beam measurement quantity results per neighbor cell. The UE derives a beam measurement quantity reporting value for the one beam or for the multiple different beams per neighbor cell based on applying a layer 1 filtering procedure to the plurality of one beam measurement quantity results per neighbor cell or the plurality of multiple different beam measurement quantity results per neighbor cell. The layer 1 filtering procedure includes determining the beam measurement quantity reporting value for the one beam or for each of the multiple different beams per neighbor cell as i) a highest value one of the plurality of one beam measurement quantity results per neighbor cell or each of the plurality of multiple different beam measurement quantity results per neighbor cell if a) a layer 1 maximum number of beam measurements to be averaged threshold is not configured; or b) a layer 1 beam measurement value threshold for consolidation is not configured; or c) the highest value one of the plurality of one beam measurement quantity results per neighbor cell or each of the plurality of multiple different beam measurement quantity results per neighbor cell per neighbor cell is below or equal to the layer 1 beam measurement value threshold for consolidation. Absent a), b), or c), the UE determines the beam measurement quantity reporting value for the one beam or for each of the multiple different beams per neighbor cell as a linear power scale average of highest value ones of the plurality of one beam measurement quantity results per neighbor cell or the plurality of multiple different beam measurement quantity results per neighbor cell above the layer 1 measurement value threshold for consolidation, where a total number of averaged ones of the plurality of one beam measurement quantity results per neighbor cell or the plurality of multiple different beam measurement quantity results per neighbor cell does not exceed the layer 1 maximum number of measurements to be averaged threshold. The UE then transmits a report including the formatted beam measurement quantity reporting value for the one beam or for each of the multiple different beams per neighbor cell to a serving cell of the UE.

Additional example #2 includes additional example #1 wherein the plurality of one beam measurement quantity results per neighbor cell or the plurality of multiple different beam measurement quantity results per neighbor cell comprise reference signal received power (RSRP) values, reference signal received quality (RSRQ) values, signal to noise and interference ratio (SINR) values, or any combination thereof. Additional example #3 includes any of additional examples #1-#2 wherein measuring reference signals for the one beam or for the multiple different beams for the one or more neighbor cells comprises measuring synchronization signal blocks (SSBs) or measuring channel state information reference signals (CSI-RS). Additional example #4 includes any of additional examples #1-3 wherein measuring reference signals for the one beam or for the multiple different beams for the one or more neighbor cells comprises measuring for a configured number of neighbor cells. Additional example #5 includes any of additional examples #1-4 receiving a configuration indicating one or more of the layer 1 maximum number of beam measurements to be averaged threshold, the layer 1 beam measurement value threshold for consolidation, a measurement quantity type, or a reference signal type. Additional example #6 includes any of additional examples #1-5 wherein deriving the beam measurement quantity reporting value for the one beam or for the multiple different beams per neighbor cell comprises deriving a single beam measurement quantity reporting value per neighbor cell. Additional example #7 includes any of additional examples #1-6 wherein the plurality of one beam measurement quantity results per neighbor cell or the plurality of multiple different beam measurement quantity results per neighbor cell are associated with a respective reference signal identifier (RS ID), and wherein deriving the beam measurement quantity reporting value for the one beam or for the multiple different beams per neighbor cell further comprises associating the respective RS ID to each beam measurement quantity reporting value for each reference signal per neighbor cell. Additional example #8 includes any of additional examples #1-7 further including receiving a cell switch command indicating a target neighbor cell based on the report of the beam measurement quantity reporting value for the one beam or for each of the multiple different beams per neighbor cell; and switching a communication connection from the serving cell to the target neighbor cell. Additional example #9 includes additional examples #1-8 wherein the cell switch command further indicates a target beam, and wherein switching the communication connection includes switching to receiving the target beam.

As an additional example #12, methods, apparatuses, and computer program product for serving cell change faster than L3 serving cell change are disclosed herein. In such examples, a base station receives a report of a beam measurement quantity reporting value for one beam or for each of multiple different beams for one or more neighbor cells of a UE served by the base station. The beam measurement quantity reporting value for one beam or for each of multiple different beams for one or more neighbor cells are derived by the UE based on applying a layer 1 filtering procedure to a plurality of one beam measurement quantity results per neighbor cell or a plurality of multiple different beam measurement quantity results per neighbor cell. The base station selects a target cell based on the beam measurement quantity reporting value for one beam or for each of the multiple different beams for one or more neighbor cells in the report. The base station transmits a cell switch command indicating the target neighbor cell. Additional example #13 includes additional example #12 wherein the cell switch command further indicates a target beam from the report of the beam measurement quantity reporting value for the one beam or for each of the multiple different beams for one or more neighbor cells. Additional example #14 includes and of additional example #12-#13 wherein the base station transmits a configuration indicating one or more of the layer 1 maximum number of beam measurements to be averaged threshold, the layer 1 beam measurement value threshold for consolidation, a measurement quantity type, or a reference signal type.

As a further example #15, methods, apparatuses, and computer program product for serving cell change faster than L3 serving cell change are disclosed herein. In such examples, a UE measures, for each of at least one beam of each of at least one neighboring cell of a UE, at least one reference signal (RS) to obtain at least one layer 1 (L1) beam measurement. The UE 104 derives, for each neighboring cell based on each L1 beam measurement corresponding to the each neighboring cell, at least one L1 measurement reporting value. The UE 104 transmits, to a serving cell serving the UE 104, a report based on each derived L1 measurement reporting value.

Further example #16 includes further example #15 wherein deriving, for each neighboring cell based on each L1 beam measurement corresponding to the each neighboring cell, at least one L1 measurement reporting value, includes determining one of i) a highest value beam measurement as the at least one L1 measurement reporting value; and ii) a linear power scale average of a plurality of highest value beam measurements above an L1 layer 1 measurement value threshold for consolidation as the at least one L1 measurement reporting value. Further example #17 includes further example #16 wherein determining one of the highest value beam measurement and the linear power scale average as the at least one L1 measurement reporting value includes determining the highest value L1 beam measurement as the at least one L1 measurement reporting value if i) an L1 maximum number of beam measurements to be averaged threshold is not configured, or ii) an L1 beam measurement value threshold for consolidation is not configured, or iii) the highest value beam measurement is below or equal to a configured layer 1 beam measurement value threshold for consolidation; else determining the linear power scale average as the at least one L1 measurement reporting value. Further example #18 includes further example #17 further including receiving a configuration indicating one or more of: the L1 maximum number of beam measurements to be averaged threshold, the L1 beam measurement value threshold for consolidation, a measurement quantity type, or an RS type to be measured.

Further example #19 includes any of further examples #16-18 wherein a number of beam measurements used in determining the linear power scale average as the at least one L1 measurement reporting value does not exceed a configured L1 maximum number of beam measurements to be averaged threshold. Further example #20 includes any of further examples #15-19 wherein the at least one L1 beam measurement comprises at least one reference signal received power (RSRP) value, at least one reference signal received quality (RSRQ) value, at least one signal to interference-plus-noise ratio (SINR) value, or any combination thereof. Further example #21 includes any of further examples #15-20 wherein measuring at least one reference signal comprises measuring at least one synchronization signal block (SSB). Further example #22 includes any of further examples #15-21 wherein measuring at least one reference signal comprises measuring at least one channel state information reference signal (CSI-RS). Further example #23 includes any of further examples #15-22 wherein measuring at least one reference signal comprises measuring for a configured number of neighbor cells. Further example #24 includes any of further examples #15-23 further including receiving a cell switch command indicating a target neighbor cell based on the report; and switching a communication connection from the serving cell to the target neighbor cell. Further example #25 includes further example #24 wherein the cell switch command further indicates a target beam of the target cell, and wherein switching the communication connection includes switching to receiving the target beam.

As a further example #26, methods, apparatuses, and computer program product for serving cell change faster than L3 serving cell change are disclosed herein. In such examples, a serving cell serving a UE receives a report including at least one L1 measurement reporting value for each of one or more neighboring cells of the UE. The serving cell selects a target cell based on the at least one L1 measurement reporting value for each of one or more neighboring cells of the UE. The serving cell then transmits, to the UE, a cell switch command indicating the target cell. Further example #27 includes further example #26, wherein each at least one L1 measurement reporting value is a function of at least one beam measurement i) at the UE, and ii) based on at least one reference signal (RS) of at least one beam of each of at least one neighboring cell of the UE. Further example #28 includes example #27 wherein the cell switch command further indicates a target beam of the target cell.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE) comprising:
   measuring, for each of at least one beam of each of at least one neighboring cell of the UE, the UE served by a serving cell, at least one reference signal (RS) to obtain at least one layer 1 (L1) beam measurement;
   deriving, for each neighboring cell based on each L1 beam measurement corresponding to the each neighboring cell, at least one L1 measurement reporting value by determining one of:
      a highest value L1 beam measurement as the at least one L1 measurement reporting value: and
      a linear power scale average of a plurality of highest value L1 beam measurements above an L1 measurement value threshold for consolidation as the at least one L1 measurement reporting value; and
   transmitting, to the serving cell, a report based on each derived L1 measurement reporting value.

2. The method of claim 1, wherein determining one of the highest value beam measurement and the linear power scale average as the at least one L1 measurement reporting value comprises:
   determining the highest value L1 beam measurement as the at least one L1 measurement reporting value when:
      a L1 maximum number of beam measurements to be averaged threshold is not configured; or
      a L1 beam measurement value threshold for consolidation is not configured; or
      the highest value beam measurement is below or equal to a configured layer 1 beam measurement value threshold for consolidation; otherwise
   determining the linear power scale average as the at least one L1 measurement reporting value.

3. The method of claim 2, further comprising receiving a configuration indicating one or more of the L1 maximum number of beam measurements to be averaged threshold, the L1 beam measurement value threshold for consolidation, a measurement quantity type, or an RS type to be measured.

4. The method of claim 1, wherein a number of beam measurements used in determining the linear power scale average as the at least one L1 measurement reporting value does not exceed a configured L1 maximum number of beam measurements to be averaged threshold.

5. The method of claim 1, wherein the at least one L1 measurement reporting value is a cell-level L1 measurement reporting value for each at least one neighboring cell, and wherein each cell-level L1 measurement reporting value corresponds to an L1 beam measurement for one of the at least one neighboring cell.

6. The method of claim 1, wherein the at least one L1 measurement reporting value is a beam level L1 measurement reporting value for each beam of each neighboring cell, and wherein each beam-level L1 measurement reporting value reports an L1 beam measurement for each of up to a number of RS identifications (RS IDs) per cell.

7. The method of claim 1, wherein the at least one L1 beam measurement comprises at least one reference signal received power (RSRP) value, at least one reference signal received quality (RSRQ) value, at least one signal to interference-plus-noise ratio (SINR) value, or any combination thereof.

8. The method of claim 1, wherein measuring at least one reference signal comprises measuring at least one synchronization signal block (SSB).

9. The method of claim 1, wherein measuring at least one reference signal comprises measuring at least one channel state information reference signal (CSI-RS).

10. The method of claim 1, wherein measuring at least one reference signal comprises measuring for a configured number of neighbor cells.

11. The method of claim 1, further comprising:
    receiving a cell switch command indicating a target neighbor cell based on the report; and
    switching a communication connection from the serving cell to the target neighbor cell.

12. The method of claim 11, wherein the cell switch command further indicates a target beam of the target neighbor cell, and wherein switching the communication connection includes switching to receiving the target beam.

13. A user equipment (UE) apparatus, comprising:
a memory storing instructions; and
a processor in communication with the memory and configured to:
  measure, for each of at least one beam of each of at least one neighboring cell of the UE, the UE served by a serving cell, at least one reference signal (RS) to obtain at least one layer 1 (L1) beam measurement;
derive, for each neighboring cell based on each L1 beam measurement corresponding to the each neighboring cell, at least one L1 measurement reporting value by determining one of:
  a highest value L1 beam measurement as the at least one L1 measurement reporting value: and
    a linear power scale average of a plurality of highest value L1 beam measurements above an L1 measurement value threshold for consolidation as the at least one L1 measurement reporting value; and
  transmit, to the serving cell, a report based on each derived L1 measurement reporting value.

14. The apparatus of claim 13, wherein determining one of the highest value beam measurement and the linear power scale average as the at least one L1 measurement reporting value comprises:
  determining the highest value L1 beam measurement as the at least one L1 measurement reporting value when:
    a L1 maximum number of beam measurements to be averaged threshold is not configured; or
    a L1 beam measurement value threshold for consolidation is not configured; or
    the highest value beam measurement is below or equal to a configured layer 1 beam measurement value threshold for consolidation; otherwise
  determining the linear power scale average as the at least one L1 measurement reporting value.

15. The apparatus of claim 14, wherein the processor is further configured to:
  receive a configuration indicating one or more of: the L1 maximum number of beam measurements to be averaged threshold, the L1 beam measurement value threshold for consolidation, a measurement quantity type, or an RS type to be measured.

16. The apparatus of claim 13, wherein a number of beam measurements used in determining the linear power scale average as the at least one L1 measurement reporting value does not exceed a configured L1 maximum number of beam measurements to be averaged threshold.

17. The apparatus of claim 13, wherein the at least one L1 beam measurement comprises at least one reference signal received power (RSRP) value, at least one reference signal received quality (RSRQ) value, at least one signal to interference-plus-noise ratio (SINR) value, or any combination thereof.

18. The apparatus of claim 13, wherein measuring at least one reference signal comprises measuring at least one synchronization signal block (SSB).

* * * * *